(12) United States Patent
Nishio

(10) Patent No.: US 11,032,484 B2
(45) Date of Patent: Jun. 8, 2021

(54) IMAGE PROCESSING APPARATUS, IMAGING APPARATUS, IMAGE PROCESSING METHOD, IMAGING METHOD, AND PROGRAM

(71) Applicant: FUJIFILM Corporation, Tokyo (JP)

(72) Inventor: Yuya Nishio, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/805,847

(22) Filed: Mar. 2, 2020

(65) Prior Publication Data
US 2020/0204723 A1     Jun. 25, 2020

Related U.S. Application Data

(63) Continuation of application No. PCT/JP2018/023832, filed on Jun. 22, 2018.

(30) Foreign Application Priority Data

Sep. 29, 2017   (JP) .............................. JP2017-190537

(51) Int. Cl.
*H04N 5/235*       (2006.01)
*H04N 9/73*        (2006.01)

(52) U.S. Cl.
CPC ......... *H04N 5/2355* (2013.01); *H04N 5/2351* (2013.01); *H04N 5/2353* (2013.01); *H04N 9/73* (2013.01)

(58) Field of Classification Search
CPC .. H04N 5/2355; H04N 5/2351; H04N 5/2353; H04N 9/73
See application file for complete search history.

(56) References Cited

U.S. PATENT DOCUMENTS

| 7,129,980 | B1 * | 10/2006 | Ashida ..................... G03B 7/28 348/333.04 |
| 9,218,653 | B2 * | 12/2015 | Prabhudesai ........... G06T 5/008 |

FOREIGN PATENT DOCUMENTS

| JP | 2000217033 | 8/2000 |
| JP | 2003264739 | 9/2003 |
| JP | 2006050085 | 2/2006 |
| JP | 2006115249 | 4/2006 |
| JP | 2009017229 | 1/2009 |
| JP | 2016173777 | 9/2016 |

OTHER PUBLICATIONS

"International Search Report (Form PCT/ISA/210) of PCT/JP2018/023832," dated Aug. 28, 2018, with English translation thereof, pp. 1-4.
"Written Opinion of the International Searching Authority (Form PCT/ISA/237) of PCT/JP2018/023832," dated Aug. 28, 2018, with English translation thereof, pp. 1-7.

* cited by examiner

*Primary Examiner* — Ahmed A Berhan
(74) *Attorney, Agent, or Firm* — JCIPRNET

(57) ABSTRACT

An image processing apparatus includes a processor configured to divide a captured image into a plurality of regions, calculate first white balance related information based on a pixel value of each of the plurality of regions, acquire second white balance related information set by a user for the captured image, and decide a priority region for which a condition of a dynamic range expansion process to be performed on the captured image is set based on brightness of the priority region.

20 Claims, 22 Drawing Sheets

IMAGE PROCESSING APPARATUS, IMAGING APPARATUS, IMAGE PROCESSING METHOD, IMAGING METHOD, AND PROGRAM

CROSS-REFERENCE TO RELATED APPLICATIONS

This application is a Continuation of PCT International Application No. PCT/JP2018/023832 filed on Jun. 22, 2018, which claims priority under 35 U.S.C. § 119(a) to Japanese Patent Application No. 2017-190537 filed on Sep. 29, 2017. Each of the above application(s) is hereby expressly incorporated by reference, in its entirety, into the present application.

BACKGROUND OF THE INVENTION

1. Field of the Invention

The present invention relates to an image processing apparatus, an imaging apparatus, an image processing method, an imaging method, and a program and particularly, to a technology in a case of performing a dynamic range expansion process.

2. Description of the Related Art

In a case where a captured image of a subject having a wide dynamic range is acquired by a digital camera or the like, a white void of a highlight part or a black solid of a shadow part may occur.

One method of representing a wider dynamic range of the subject in the captured image is a dynamic range expansion process. The dynamic range expansion process is a process of performing exposure by decreasing exposure from appropriate exposure such that the number of pixels saturated in an input signal on a highlight side is reduced, and correcting brightness of an output signal by applying a tone curve reducing a black solid of a shadow side and a white void of the highlight side to the input signal. A technology related to the dynamic range expansion process has been suggested in the related art.

For example, JP2016-173777A discloses a technology for increasing a degree of correction of a region of crushed gradations in a case where presence of a predetermined subject is estimated in the region of crushed gradations. Specifically, in the technology disclosed in JP2016-173777A, presence or absence of the region of crushed gradations is detected from an image signal. Presence or absence of the subject is estimated using information related to an imaged scene (time information at a time of imaging, weather information, position, area, or shape information of the region of crushed gradations in the image, or movement information of the subject in the image), and input and output characteristics are controlled.

In addition, for example, JP2009-017229A discloses a technology for setting an appropriate dynamic range by automatically determining the imaged scene. Specifically, in JP2009-017229A, a technology for deciding the dynamic range based on a difference between a maximum value of a brightness value of each region and an expected saturation brightness value, and the number of regions of which the brightness value exceeds the expected saturation brightness value is disclosed.

SUMMARY OF THE INVENTION

Even in the same scene (the same subject and the same angle of view), whether to focus on the highlight side or the shadow side of the captured image and whether to provide gradations in the region of the highlight side or the shadow side may vary depending on a user (an imaging person or a user of an image processing apparatus). For example, even in the same scene, there is a user who desires to provide a larger number of gradations in the region of the shadow side, and there is also a user who desires to provide a larger number of gradations in the region of the highlight side. That is, each user performs imaging or image processing with a different imaging intention.

However, in the technology disclosed in JP2016-173777A, the degree of correction is controlled by estimating the presence or absence of the subject using the information related to the imaged scene, and the user does not control the degree of correction based on actively set information. Thus, a case where the imaging intention of the user is not reflected on the degree of correction may occur.

In the technology disclosed in JP2009-017229A, the dynamic range is decided based on the difference between the maximum value of the brightness value of each region and the expected saturation brightness value, and the number of regions of which the brightness value exceeds the expected saturation brightness value. However, such control is not based on information actively set by the user. That is, since such control is automatic determination control, a case where the imaging intention of the user is not reflected on the decision of the dynamic range occurs.

The present invention is conceived in view of the above matter. An object of the present invention is to provide an image processing apparatus, an imaging apparatus, an image processing method, an imaging method, and a program capable of deciding a priority region for performing a dynamic range expansion process corresponding to an imaging intention of a user.

In order to achieve the object, an image processing apparatus that is one aspect of the present invention comprises a processor configured to acquire a captured image in which a subject is imaged, divide the captured image into a plurality of regions based on brightness information of the captured image, calculate first white balance related information for each of the divided plurality of regions, acquire second white balance related information set by a user for the captured image, and decide a priority region which is decided based on the first white balance related information and the second white balance related information and for which a condition of a dynamic range expansion process to be performed on the captured image is set based on brightness of the priority region.

According to the present aspect, the processor configured to calculate the first white balance related information for each of the divided plurality of regions. The processor configured to acquire the second white balance related information set by the user for the captured image. According to the present aspect, the processor configured to decide the priority region that is decided based on the first white balance related information and the second white balance related information and for which the condition of the dynamic range expansion process to be performed on the captured image is set based on the brightness of the priority region. Accordingly, in the present aspect, since the priority region of the dynamic range expansion process corresponding to a white balance actively set by the user is decided, the priority region that enables implementation of the dynamic range expansion process on which an imaging intention of the user is reflected can be decided.

It is preferable that the processor configured to decide the region in which a difference between the first white balance related information and the second white balance related information is small as the priority region.

According to the present aspect, the region in which the difference between the first white balance related information and the second white balance related information is small is decided as the priority region.

It is preferable that the processor configured to divide the captured image into at least a highlight region and a shadow region, and the decide the highlight region as the priority region in a case where a difference between the first white balance related information and the second white balance related information in the highlight region is smaller than the difference in the shadow region, and decide the shadow region as the priority region in a case where the difference in the shadow region is smaller than the difference in the highlight region.

According to the present aspect, the captured image is divided into at least the highlight region and the shadow region. The difference between the first white balance related information and the second white balance related information is calculated for the highlight region and the shadow region. The region in which the difference is small is decided as the priority region.

It is preferable that the processor configured to decide a tone curve depending on the priority region.

According to the present aspect, the processor configured to decide the tone curve depending on the priority region.

It is preferable that the processor configured to decide the tone curve that sets appropriate brightness of the priority region.

According to the present aspect, the processor configured to decide the tone curve that sets appropriate brightness of the priority region.

It is preferable that the processor configured to divide the captured image into a plurality of blocks, and divide the captured image into the plurality of regions in units of blocks based on the brightness information of each of the plurality of blocks.

According to the present aspect, the processor configured to divide the captured image into the plurality of blocks, and divide the captured image into the plurality of regions in units of blocks based on the brightness information of each of the plurality of blocks.

It is preferable that the processor configured to calculate the first white balance related information by decreasing a reference weight of the block positioned at each boundary between the plurality of regions below a reference weight of the block not positioned at each boundary.

According to the present aspect, the processor configured to calculate the first white balance related information by decreasing the reference weight of the block positioned at each boundary between the plurality of regions below the reference weight of the block not positioned at each boundary.

It is preferable that the processor configured to perform a white balance correction process on the captured image.

According to the present aspect, the processor configured to perform the white balance correction process.

It is preferable that the processor configured to perform the white balance correction process on the captured image based on the second white balance related information.

According to the present aspect, the processor configured to perform the white balance correction process on the captured image based on the second white balance related information.

It is preferable that the processor configured to perform the white balance correction process based on the second white balance related information in the priority region among the plurality of regions, and performs the white balance correction process based on the first white balance related information in a region other than the priority region among the plurality of regions.

According to the present aspect, the processor configured to perform the white balance correction process based on the second white balance related information in the priority region among the plurality of regions, and performs the white balance correction process based on the first white balance related information in the region other than the priority region among the plurality of regions.

It is preferable that the processor configured to perform the white balance correction process for each pixel constituting the captured image.

According to the present aspect, the processor configured to perform the white balance correction process for each pixel constituting the captured image.

It is preferable that the processor configured to perform the white balance correction process based on any one of the first white balance related information or the second white balance related information for each pixel constituting the captured image.

According to the present aspect, for each pixel constituting the captured image, the processor configured to perform the white balance correction process based on any one of the first white balance related information or the second white balance related information.

It is preferable that the first white balance related information and the second white balance related information are information indicating a white balance correction amount, color temperature information, or a tint of a light source.

According to the present aspect, the first white balance related information and the second white balance related information are information indicating the white balance correction amount, the color temperature information, or the tint of the light source.

An imaging apparatus that is another aspect of the present invention is an imaging apparatus in which the image processing apparatus is mounted, in which the processor configured to adjust exposure depending on the priority region.

According to the present aspect, the processor configured to adjust the exposure depending on the priority region.

It is preferable that the processor configured to control the exposure depending on a white void pixel of the captured image in a case where the priority region is on a highlight side more than a threshold value, and control the exposure depending on a black solid pixel of the captured image in a case where the priority region is on a shadow side less than or equal to the threshold value.

According to the present aspect, the processor configured to control the exposure depending on the white void pixel of the captured image in a case where the priority region is on the highlight side more than the threshold value, and control the exposure depending on the black solid pixel of the captured image in a case where the priority region is on the shadow side less than or equal to the threshold value.

An image processing method that is another aspect of the present invention comprises an image acquisition step of acquiring a captured image in which a subject is imaged, a region division step of dividing the captured image into a plurality of regions based on brightness information of the captured image, a first white balance related information calculation step of calculating first white balance related information for each of the plurality of regions divided in the region division step, a second white balance related information acquisition step of acquiring second white balance related information set by a user for the captured image, and a priority region decision step of deciding a priority region which is decided based on the first white balance related information and the second white balance related information and for which a condition of a dynamic range expansion process to be performed on the captured image is set based on brightness of the priority region.

An imaging method that is another aspect of the present invention comprises an image acquisition step of acquiring a captured image in which a subject is imaged, a region division step of dividing the captured image into a plurality of regions based on brightness information of the captured image, a first white balance related information calculation step of calculating first white balance related information for each of the plurality of regions divided in the region division step, a second white balance related information acquisition step of acquiring second white balance related information set by a user for the captured image, a priority region decision step of deciding a priority region which is decided based on the first white balance related information and the second white balance related information and for which a condition of a dynamic range expansion process to be performed on the captured image is set based on brightness of the priority region, and an exposure adjustment step of adjusting exposure depending on the priority region.

A program that is another aspect of the present invention causes a computer to execute an image processing method comprising an image acquisition step of acquiring a captured image in which a subject is imaged, a region division step of dividing the captured image into a plurality of regions based on brightness information of the captured image, a first white balance related information calculation step of calculating first white balance related information for each of the plurality of regions divided in the region division step, a second white balance related information acquisition step of acquiring second white balance related information set by a user for the captured image, and a priority region decision step of deciding a priority region which is decided based on the first white balance related information and the second white balance related information and for which a condition of a dynamic range expansion process to be performed on the captured image is set based on brightness of the priority region.

A program that is another aspect of the present invention causes a computer to execute an imaging method comprising an image acquisition step of acquiring a captured image in which a subject is imaged, a region division step of dividing the captured image into a plurality of regions based on brightness information of the captured image, a first white balance related information calculation step of calculating first white balance related information for each of the plurality of regions divided in the region division step, a second white balance related information acquisition step of acquiring second white balance related information set by a user for the captured image, a priority region decision step of deciding a priority region which is decided based on the first white balance related information and the second white balance related information and for which a condition of a dynamic range expansion process to be performed on the captured image is set based on brightness of the priority region, and an exposure adjustment step of adjusting exposure depending on the priority region.

According to the present invention, the first white balance related information is calculated for each of the plurality of regions divided by the region division unit. The second white balance related information set by the user for the captured image is acquired. The priority region that is decided based on the first white balance related information and the second white balance related information and for which the condition of the dynamic range expansion process to be performed on the captured image is set based on the brightness of the priority region is decided. Accordingly, in the present invention, since the priority region of the dynamic range expansion process corresponding to the white balance actively set by the user is decided, the priority region that enables execution of the dynamic range expansion process on which the imaging intention of the user is appropriately reflected can be decided.

DESCRIPTION OF THE PREFERRED EMBODIMENTS

Hereinafter, an image processing apparatus, an imaging apparatus, an image processing method, an imaging method, and a program according to a preferred embodiment of the present invention will be described in accordance with the appended drawings. In the following description, the imaging apparatus and the image processing apparatus mounted in the imaging apparatus will be mainly described. However, an application scope of the present invention is not limited to the description. For example, the image processing apparatus according to the embodiment of the present invention can be mounted in a computer.

Figure 1:
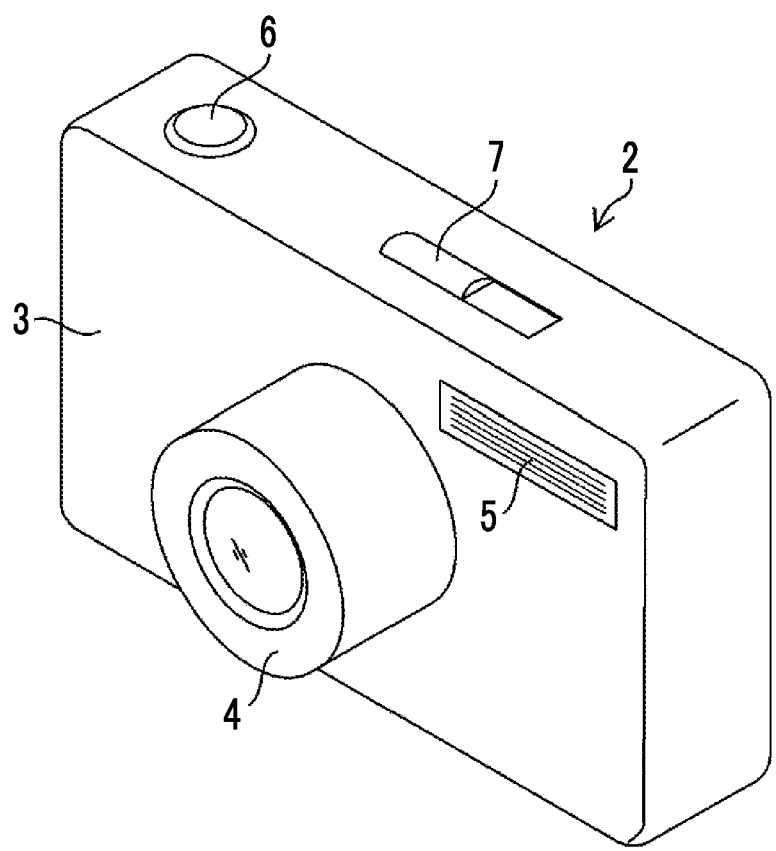
FIG. 1 is a perspective front view of a digital camera.
Figure 2:
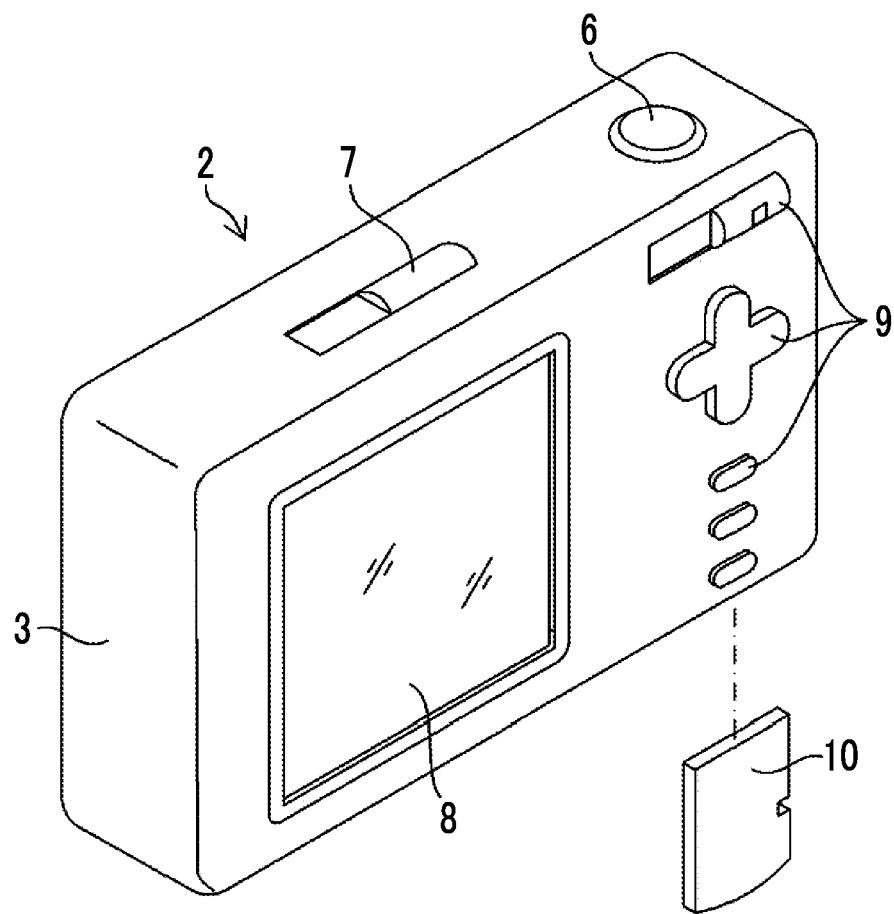
FIG. 2 is a perspective rear view of the digital camera.

FIG. 1 is a perspective front view of a digital camera 2 that is the imaging apparatus according to the embodiment of the present invention. FIG. 2 is a perspective rear view of the digital camera 2.

The digital camera 2 comprises a camera main body 3 and a lens barrel 4 attached to a front surface of the camera main body 3. The lens barrel 4 and the camera main body 3 may be integrated or may be attachably and detachably disposed as an interchangeable lens type camera.

A flash light emission unit 5 is disposed on the front surface of the camera main body 3 in addition to the lens barrel 4. A shutter button 6 and a power supply switch 7 are disposed on an upper surface of the camera main body 3. The shutter button 6 is an imaging instruction unit that receives an imaging instruction from a user, and is configured with a two-stage stroke type switch that includes an S1 switch which is switched ON at a time of a half push, and an S2 switch which is switched ON at a time of a full push. The power supply switch 7 is a power supply switching unit that receives an instruction to switch a power supply of the digital camera 2 ON and OFF from the user.

A display unit 8 configured with a liquid crystal panel or the like and an operation unit 9 directly operated by the user are disposed on the rear surface of the camera main body 3. In an imaging standby state, the display unit 8 functions as an electronic viewfinder by displaying a live view image (live preview image). When a captured image or an image stored in a memory is played back, the display unit 8 functions as a playback image display unit.

The operation unit 9 is configured with any operation device such as a mode switch, a cross key, and an execution key. For example, the mode switch is operated by the user in a case where an operation mode of the digital camera 2 is switched. The operation mode of the digital camera 2 includes an imaging mode (an auto imaging mode, a manual imaging mode, a consecutive capturing mode, and the like) for obtaining the captured image by imaging a subject, a playback mode in which the image is displayed and played back, and the like.

The auto imaging mode is a mode in which an autofocus (AF) function of automatically performing focus adjustment, an automatic exposure (auto exposure (AE)) function of automatically setting an F number and a shutter speed, and the like are used. The manual imaging mode is a mode in which the user can appropriately set the focus adjustment, the F number, the shutter speed, and the like using the operation unit 9.

The cross key and the execution key are operated by the user in a case where a menu screen or a setting screen is displayed on the display unit 8, a cursor displayed in the menu screen or the setting screen is moved, or various settings of the digital camera 2 are confirmed.

A memory slot into which an external memory 10 is mounted, and a mounting lid that opens and closes an opening of the memory slot are disposed in a bottom portion (not illustrated) of the camera main body 3. The external memory 10 is disposed to be attachable and detachable with respect to the camera main body 3. In a case where the external memory 10 is mounted in the camera main body 3, the external memory 10 is electrically connected to a storage control unit 33 disposed in the camera main body 3. The external memory 10 can be generally configured with a semiconductor memory such as a card type flash memory but is not particularly limited. A storage medium of any storage method such as a magnetic medium can be used as the external memory 10.

Figure 3:
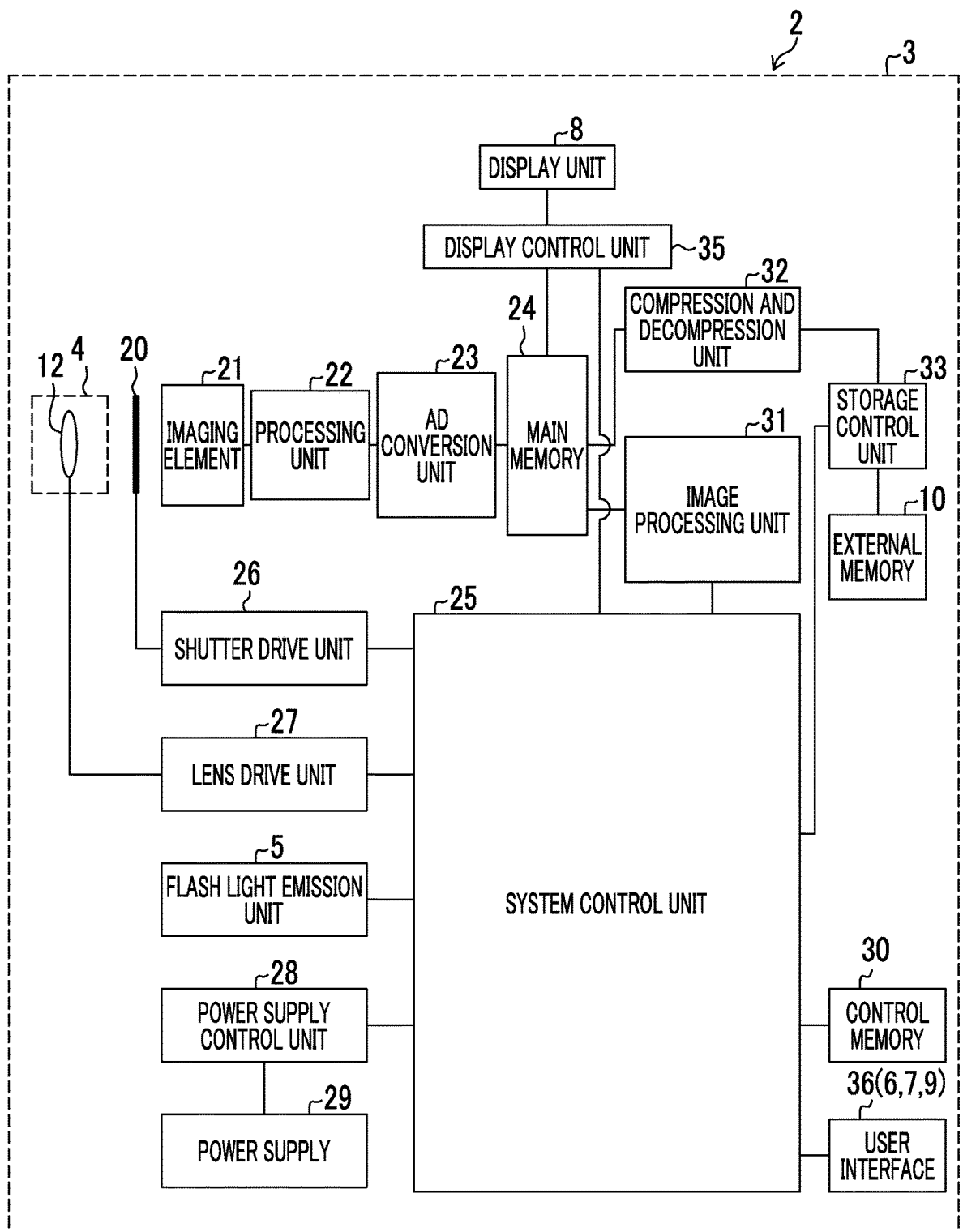
FIG. 3 is a block diagram illustrating a control processing system of the digital camera.

FIG. 3 is a block diagram illustrating a control processing system of the digital camera 2.

Subject light passes through a lens unit 12 disposed in the lens barrel 4 and a mechanical shutter 20 disposed in the camera main body 3 and is received by an imaging element 21 (imaging unit). The lens unit 12 is configured with an imaging optical system that includes an imaging lens (lens group) and a stop. The imaging element 21 is an element that generates an imaging signal (image data) by receiving a subject image. The imaging element 21 includes a color filter of red, green, blue (RGB) and the like and an image sensor such as a charge coupled device (CCD) or a complementary metal oxide semiconductor (CMOS) that converts an optical image into an electric signal. The image data output from the imaging element 21 is processed by an automatic gain control (AGC) circuit or the like in a processing unit 22. Then, the image data in an analog format is converted into image data in a digital format by an analog digital (AD) conversion unit 23. The digitized image data is stored in a main memory 24.

The main memory 24 is a region that temporarily stores the image data, and is configured with a dynamic random access memory (DRAM) or the like. The image data that is transmitted from the AD conversion unit 23 and accumulated in the main memory 24 is read out by an image processing unit 31 that is controlled by a system control unit 25. The image processing unit 31 performs various image processing such as white balance correction, gamma-correction processing, and a demosaicing process using the image data generated by the imaging element 21 as input image data, and stores the image data after image processing in the main memory 24 again.

The image data that is subjected to image processing in the image processing unit 31 and stored in the main memory 24 is read out by a display control unit 35 and a compression and decompression unit 32. The display control unit 35 controls the display unit 8 and displays the image data read out from the main memory 24 on the display unit 8. The image data that is output from the imaging element 21 and subjected to image processing in the image processing unit 31 is displayed on the display unit 8 as an imaging check image (post view image).

The compression and decompression unit 32 creates image data of any compression format such as Joint Photographic Experts Group (JPEG) or Tagged Image File Format (TIFF) by performing a compression process on the image data read out from the main memory 24. The image data after the compression process is stored in the external memory 10 by a storage control unit 33 that controls a process of storing data in the external memory 10 and a process of reading out data from the external memory 10. Imaging information is added to the image data in any format. For example, Exchangeable image file format (Exif) can be employed.

In the playback mode in which the image data stored in the external memory 10 is played back, the image data stored in the external memory 10 is read out by the storage control unit 33 controlled by the system control unit 25, is subjected to a decompression process by the compression and decompression unit 32, and then, is stored in the main memory 24. Then, in the same procedure as a display for checking the captured image, the image data is read out from the main memory 24 by the display control unit 35, and the image data is displayed and played back on the display unit 8.

In a case where a first stage push (half push) of the shutter button 6 occurs, an AF processing function of the digital camera 2 performs integrating accumulation on absolute values of high-frequency components of the image data corresponding to an AF area obtained at a time of the half push and outputs an integrating accumulation value (AF evaluation value) to the system control unit 25.

In a case where the first stage push (half push) of the shutter button 6 occurs, an AE detection function performs integrating accumulation on a digital signal corresponding to the entire screen, performs integrating accumulation on the image data in which different weights are applied to a screen center part and an edge part, and outputs an integrating accumulation value to the system control unit 25.

While the system control unit 25 controls the main memory 24, the image processing unit 31, and the storage control unit 33 as described above, the system control unit 25 also controls each of other units (the AF processing function and the AE detection function) in the digital camera 2.

For example, in a case where the shutter button 6 is half pushed at a time of the auto imaging mode, the system control unit 25 moves a focus lens of the lens unit 12 from a closest point to an infinity side through a lens drive unit 27 and acquires the AF evaluation value at each lens position from the AF processing function by operating the AF processing function. Then, the focus adjustment to the subject (main subject) is performed by searching for a focal position having the maximum AF evaluation value and moving the focus lens to the focal position. In addition, in a case where the shutter button 6 is half pushed at the time of the auto imaging mode, the system control unit 25 operates the AE detection function, calculates subject brightness (imaging Ev value) from the integrating accumulation value input from the AE detection function, and decides the F number of the stop and the shutter speed (a charge accumulation time of the mechanical shutter 20 and/or the imaging element 21) based on the imaging Ev value in accordance with a program line diagram. In a case where the shutter button 6 is fully pushed, the system control unit 25 controls the stop based on the decided F number, controls the mechanical shutter 20 through a shutter drive unit 26 based on the decided shutter speed, and controls the charge accumulation time in the imaging element 21 through an imaging element drive unit, not illustrated.

In addition, the system control unit 25 controls emission and non-emission of flash light by controlling the flash light emission unit 5. For example, the flash light emission unit 5 of the present example includes a xenon tube emitting white flash light and one or two or more color filters inserted and withdrawn between the xenon tube and a light emission window. The system control unit 25 adjusts a light emission intensity of the flash light by adjusting a light emission time of the xenon tube and adjusts a light emission color of the flash light by inserting and withdrawing the color filter. Instead of the xenon tube, the flash light emission unit 5 may use light emitting diodes of red (R), green (G), and blue (B). In this case, the flash light of any color can be emitted by adjusting the light emission intensity using a current amount flowing in the light emitting diodes of RGB and adjusting a ratio of the light emission intensities of the light emitting diodes of RGB.

Furthermore, the system control unit 25 detects whether or not a battery is mounted in a power supply 29, a type of battery, a remaining battery level, and the like by controlling a power supply control unit 28. In addition, the system control unit 25 controls various processing units constituting the image processing unit 31.

Furthermore, the system control unit 25 acquires an operation signal from a user interface 36 including the shutter button 6, the power supply switch 7, and the operation unit 9 and performs various processes and device control corresponding to the operation signal. In addition, the system control unit 25 controls the power supply control unit 28 depending on a power supply ON and OFF signal received from the power supply switch 7 and controls switching ON and OFF of the power supply 29.

A program and data necessary for the various processes and the device control performed by the system control unit 25 are stored in a control memory 30. The system control unit 25 can read out the program and the data stored in the control memory 30 as necessary. In addition, the system control unit 25 can store a new program and data in the control memory 30.

First Embodiment

Figure 4:
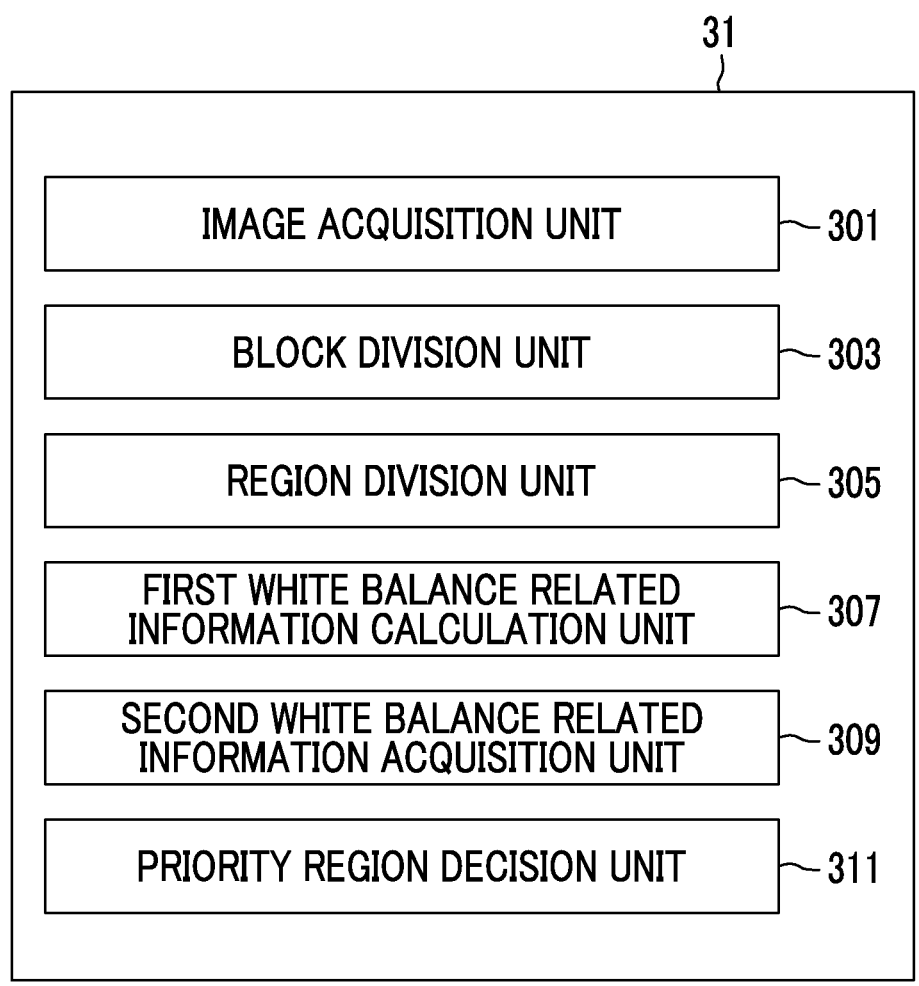
FIG. 4 is a diagram illustrating function blocks of an image processing unit.

Next, the image processing unit (image processing apparatus) 31 of the first embodiment of the present invention will be described. FIG. 4 is a diagram illustrating function blocks of the image processing unit 31 of the present embodiment.

The image processing unit 31 comprises an image acquisition unit 301, a block division unit 303, a region division unit 305, a first white balance related information calculation unit 307, a second white balance related information acquisition unit 309, and a priority region decision unit 311.

The image acquisition unit 301 acquires the captured image in which the subject is imaged. Specifically, the image acquisition unit 301 acquires the captured image by reading out the captured image that is subjected to image processing and is stored in the main memory 24, or the captured image that is not subjected to image processing. In addition, the image acquisition unit 301 acquires a captured image for recording or the live view image (a captured image for checking).

The block division unit 303 divides the captured image acquired by the image acquisition unit 301 into a plurality of blocks. For example, the block division unit 303 divides the captured image into 256 blocks by vertical 16 divisions and horizontal 16 divisions of the captured image. The block division unit 303 is not a necessary configuration in the image processing unit 31, and a subsequent process may be performed without dividing the captured image into blocks.

The region division unit 305 divides the captured image into a plurality of regions based on brightness information of the captured image. That is, the region division unit 305 acquires the brightness information for each pixel of the captured image, each block, or each predetermined region and divides the captured image into a plurality of regions based on the acquired brightness information. For example, in a case where the block division unit 303 divides the captured image into a plurality of blocks, the captured image is divided into a plurality of regions in units of blocks based on brightness (brightness information) of each of the plurality of blocks. For example, in a case of dividing the captured image into a highlight region and a shadow region, the region division unit 305 divides the captured image into the highlight region and the shadow region based on a threshold value. Instead of the brightness, luminance may be used as the brightness information. Furthermore, instead of dividing the captured image into two parts of the highlight region and the shadow region, for example, the region division unit 305 may divide the captured image into three different regions. In addition, while the region division unit 305 divides the plurality of blocks divided by the block division unit 303 into the plurality of regions, there may be a block that does not belong to any of the regions. In this case, information related to the block not belonging to any of the regions is not considered in the subsequent process.

The first white balance related information calculation unit 307 calculates first white balance related information for each of the plurality of regions divided by the region division unit 305. Specifically, the first white balance related information calculation unit 307 calculates the first white balance related information based on a pixel value of each of the plurality of regions of the captured image divided by the region division unit 305 using a well-known auto white balance algorithm. For example, the first white balance related information calculation unit 307 calculates the first white balance related information of the shadow region and the first white balance related information of the highlight region. The well-known auto white balance algorithm is not particularly limited as long as white balance related information corresponding to the pixel value of each region can be calculated. In addition, the first white balance related information is decided based on the pixel values constituting the captured image, and an imaging intention of the user is not reflected on the first white balance related information.

In a case where the captured image is divided into the blocks by the block division unit 303, the first white balance related information calculation unit 307 calculates the first white balance related information for the regions configured with the blocks. In this case, the first white balance related information calculation unit 307 calculates the first white balance related information by decreasing a reference weight of the block positioned at each boundary between the plurality of regions below the reference weight of the block not positioned at each boundary. For example, the first white balance related information calculation unit 307 sets the reference weight of the block positioned at each boundary between the plurality of regions to 0.5 and sets the reference weight of the block not positioned at each boundary to 1. The block positioned at the boundary between the regions is a block that constitutes the boundary, or a block that is positioned in a width of two or three blocks from the boundary.

The second white balance related information acquisition unit 309 acquires second white balance related information that is set by the user with respect to the captured image. The user of the digital camera 2 recognizes an imaging environment at a time of imaging and selects or sets a white balance correction process on which the imaging intention of the user is well reflected through the operation unit 9. For example, a case where the imaging intention of the user is reflected is a case where the user selects a white balance mode in which a correction amount such as "clear sky", "shade", "daylight fluorescent lamp", "neutral white fluorescent lamp", "white fluorescent lamp", and "electric bulb" is fixed, a case where the user selects the correction amount from white balance candidates corresponding to a color temperature, a case where the user customizes the correction amount, or a case where the user micro-adjusts the correction amount with respect to "auto white balance" and "underwater". Meanwhile, like "auto white balance" and "underwater" that is not micro-adjusted by the user, the white balance related information that is decided by the captured image independently of the imaging intention of the user is not set as the second white balance related information. Here, "underwater" is the auto white balance that assumes underwater usage, and does not have a fixed correction amount.

The first white balance related information and the second white balance related information are not particularly limited as long as the first white balance related information and the second white balance related information are information indicating a condition of the white balance correction process. For example, the first white balance related information and the second white balance related information are information that indicates a white balance correction amount, color temperature information, or a tint of a light source.

The priority region decision unit 311 decides a priority region based on the first white balance related information and the second white balance related information. The priority region is a region in which a condition of the dynamic range expansion process to be performed on the captured image is set based on brightness of the priority region. That is, the priority region is a region that the user desires to appropriately represent in the captured image based on the first white balance related information and the second white balance related information.

For example, in a case where the captured image is divided into two regions of the highlight region and the shadow region in the region division unit 305, the priority region decision unit 311 sets a region of the two regions in which a difference between the first white balance related information and the second white balance related information is small as the priority region. Specifically, in a case where the difference between the first white balance related information and the second white balance related information is smaller in the highlight region than in the shadow region, the priority region decision unit 311 sets the highlight region as the priority region. In a case where the difference between the first white balance related information and the second white balance related information is smaller in the shadow region than in the highlight region, the priority region decision unit 311 sets the shadow region as the priority region.

Figure 5:
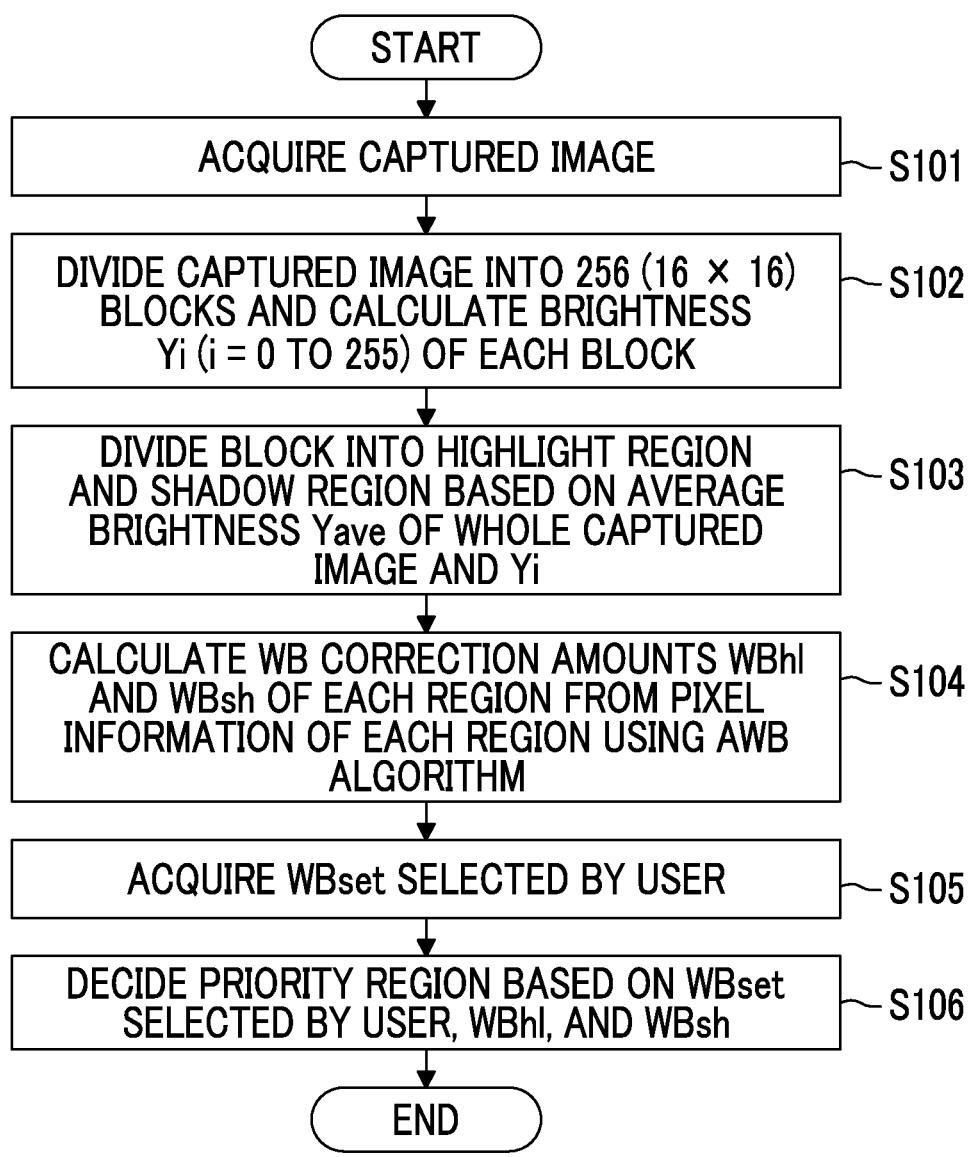
FIG. 5 is a diagram illustrating an operation flow of the image processing unit.

Next, an operation flow of the image processing apparatus of the present embodiment will be described. FIG. 5 is a diagram illustrating an operation flow of the image processing unit 31.

Figure 6:
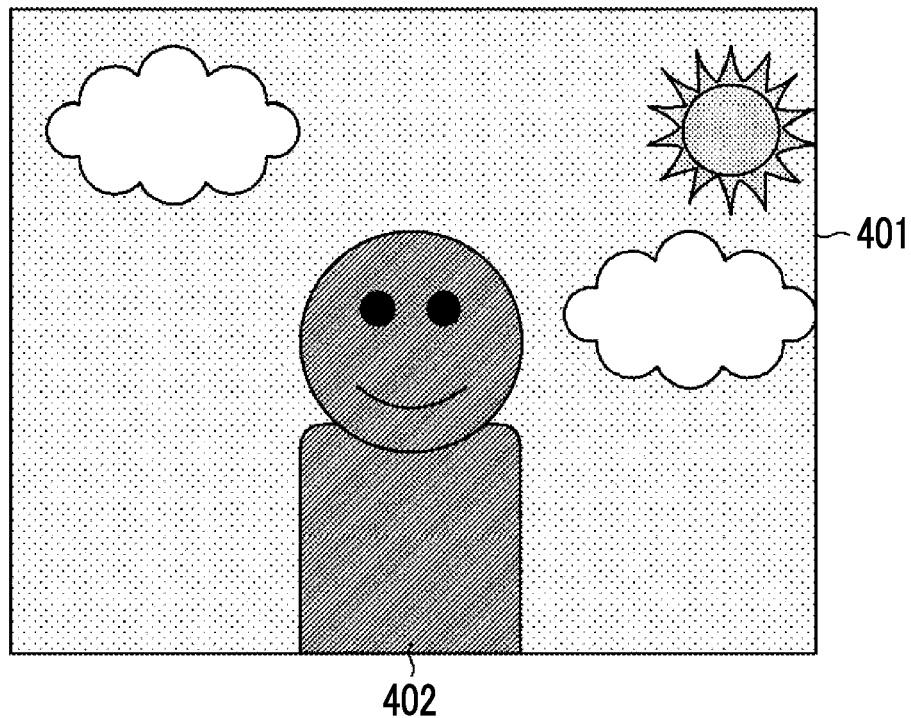
FIG. 6 is a diagram illustrating a captured image.

First, the image acquisition unit 301 acquires the captured image (step S101: image acquisition step). A captured image 401 that is acquired by the image acquisition unit 301 is illustrated in FIG. 6. The captured image 401 includes a person 402 as a main subject and is captured in an outdoor place under a clear sky.

Next, the block division unit 303 divides the captured image into 256 blocks (vertical 16 divisions x horizontal 16 divisions), and the region division unit 305 calculates brightness $Y_i$ (i=0 to 255) of each block (step S102). For example, the brightness $Y_i$ of each block calculated by the region division unit 305 is calculated using the following expression. Here, $R_i$, $G_i$, and $B_i$ are average pixel values of R pixels, G pixels, and B pixels in each block.

$$Y_i = 0.3\,R_i + 0.6\,G_i + 0.1\,B_i$$

Then, the region division unit 305 divides the blocks into the highlight region and the shadow region based on average brightness Yave of the whole captured image and the brightness $Y_i$ (step S103: region division step).

Figure 7:
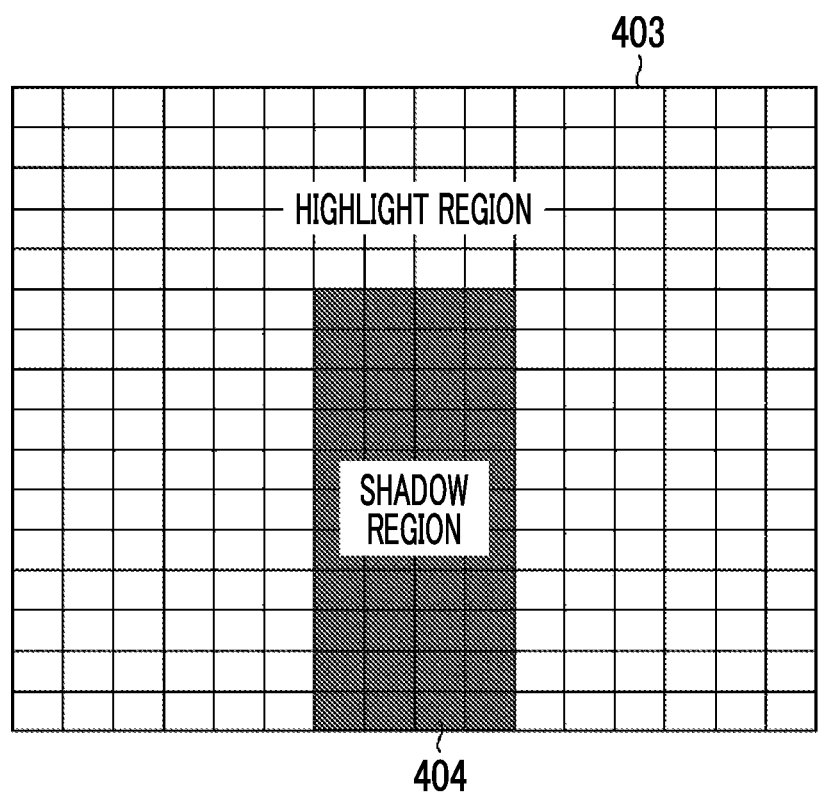
FIG. 7 is a diagram conceptually illustrating region division of the captured image.

FIG. 7 is a diagram conceptually illustrating region division of the captured image 401. In FIG. 7, the region division unit 305 divides the captured image 401 illustrated in FIG. 6 into a highlight region (clear) 403 and a shadow region (shade) 404. Specifically, the region division unit 305 calculates the average brightness Yave of the whole image of the captured image 401 using the following expression, compares the block average Yi with the average Yave of the whole, and classifies a block having Yi greater than Yave into the highlight region and classifies a block having Yi smaller than Yave into the shadow region.

$$Y_{ave} = \frac{1}{256}\sum_{i=0}^{255} Yi$$

Then, the first white balance related information calculation unit 307 calculates the white balance correction amount (a white balance correction amount WBhl of the highlight region and a white balance correction amount WBsh of the shadow region) of each region from the pixel value of each of the highlight region and the shadow region using the well-known auto white balance (AWB) algorithm (step S104: first white balance related information calculation step).

For example, the first white balance related information calculation unit 307 calculates an amount related to gains of the G pixels, the R pixels, and the B pixels of the highlight region and the shadow region. Here, GNGhl, GNRhl, and GNBhl that are calculated for the highlight region will be referred to as the white balance correction amount WBhl of the highlight region, and GNGsh, GNRsh, and GNBsh that are calculated for the shadow region will be referred to as the white balance correction amount WBsh of the shadow region.

Next, the second white balance related information acquisition unit 309 acquires WBset that is the second white balance related information set by the user (step S105: second white balance related information acquisition step). For example, in a case where the user selects a white balance mode "clear sky", the second white balance related information acquisition unit 309 acquires the white balance related information of "clear sky". For example, WBset corresponds to amounts GNGset, GNRset, and GNBset that are related to the gains of the G pixels, the R pixels, and the B pixels and are correction amounts in the white balance mode "clear sky".

The priority region decision unit 311 decides the priority region based on WBset acquired by the second white balance related information acquisition unit 309 and WBhl and WBsh calculated by the first white balance related information calculation unit 307 (step S106: priority region decision step). Specifically, the priority region decision unit 311 compares the white balance correction amounts WBhl and WBsh with the white balance correction amount WBset selected by the user. For example, the priority region decision unit 311 calculates a difference between GNB/GNR and WBset with respect to each of the highlight region and the shadow region using the ratio GNB/GNR of a B gain to an R gain as a comparison index.

$$D_{hl} = |GNB_{hl}/GNR_{hl} - GNB_{set}/GNR_{set}|$$

$$D_{sh} = |GNB_{sh}/GNR_{sh} - GNB_{set}/GNR_{set}|$$

A decision method using the above expression is an example of a case that assumes a method of adjusting the white balance by setting GNG as a fixed value and changing only GNR and GNB. The decision method is not for limitation purposes. For example, an absolute value DFRhl of a difference between the R gains of WBhl and WBset, an absolute value DFGhl of a difference between the G gains of WBhl and WBset, and an absolute value DFBhl of a difference between the B gains of WBhl and WBset may be calculated. In the same manner, absolute values DFRsh, DFGsh, and DFBsh of differences between the gains of WBsh and WBset may be calculated, and the absolute values of the differences may be compared. Specifically, a method of comparing DFRhl+DFGhl+DFBhl with DFRsh+DFGsh+DFBsh is considered as one example.

Next, the priority region decision unit 311 sets the highlight region as the priority region in a case of Dhl≤Dsh, and sets the shadow region as the priority region in a case of Dhl>Dsh.

In the embodiment, a hardware structure of processing units such as the system control unit 25 and the image processing unit 31 executing various processes corresponds to various processors illustrated below. The various processors include a central processing unit (CPU) that is a general-purpose processor functioning as various processing units by executing software (program), a programmable logic device (PLD) such as a field programmable gate array (FPGA) that is a processor of which a circuit configuration can be changed after manufacturing, a dedicated electric circuit such as an application specific integrated circuit (ASIC) that is a processor having a circuit configuration dedicatedly designed to execute a specific process, and the like.

One processing unit may be configured with one of the various processors or may be configured with two or more processors of the same type or different types (for example, a plurality of FPGAs or a combination of a CPU and an FPGA). In addition, a plurality of processing units may be configured with one processor. As an example of configuring a plurality of processing units with one processor, a first form is configuring one processor with a combination of one or more CPUs and software and implementing functions of a plurality of processing units by the processor as represented by a computer such as a client and a server. A second form is using a processor that implements the function of the whole system including a plurality of processing units by one integrated circuit (IC) chip as represented by a system on chip (SoC) and the like. Various processing units are configured using one or more of the various processors as a hardware structure.

Furthermore, the hardware structure of the various processors is more specifically an electric circuit (circuitry) in which circuit elements such as semiconductor elements are combined.

Each configuration and each function described above can be appropriately implemented by any hardware, software, or a combination of both hardware and software. For example, the present invention can also be applied to a program that causes a computer to execute the process steps (process procedure) described above, a computer-readable recording medium (non-transitory recording medium) on which the program is recorded, or a computer on which the program can be installed.

<Dynamic Range Expansion Process>

Next, the dynamic range expansion process that is performed using the priority region will be described.

First, exposure control in the dynamic range expansion process will be described. In a case where the user prioritizes a highlight side (highlight region) in the captured image, that is, in a case where the user desires to increase the number of color representations by providing gradations on the highlight side, imaging is performed by decreasing a width of decrease of exposure at a time of imaging and reducing the number of white void pixels on the highlight side.

Figure 8:
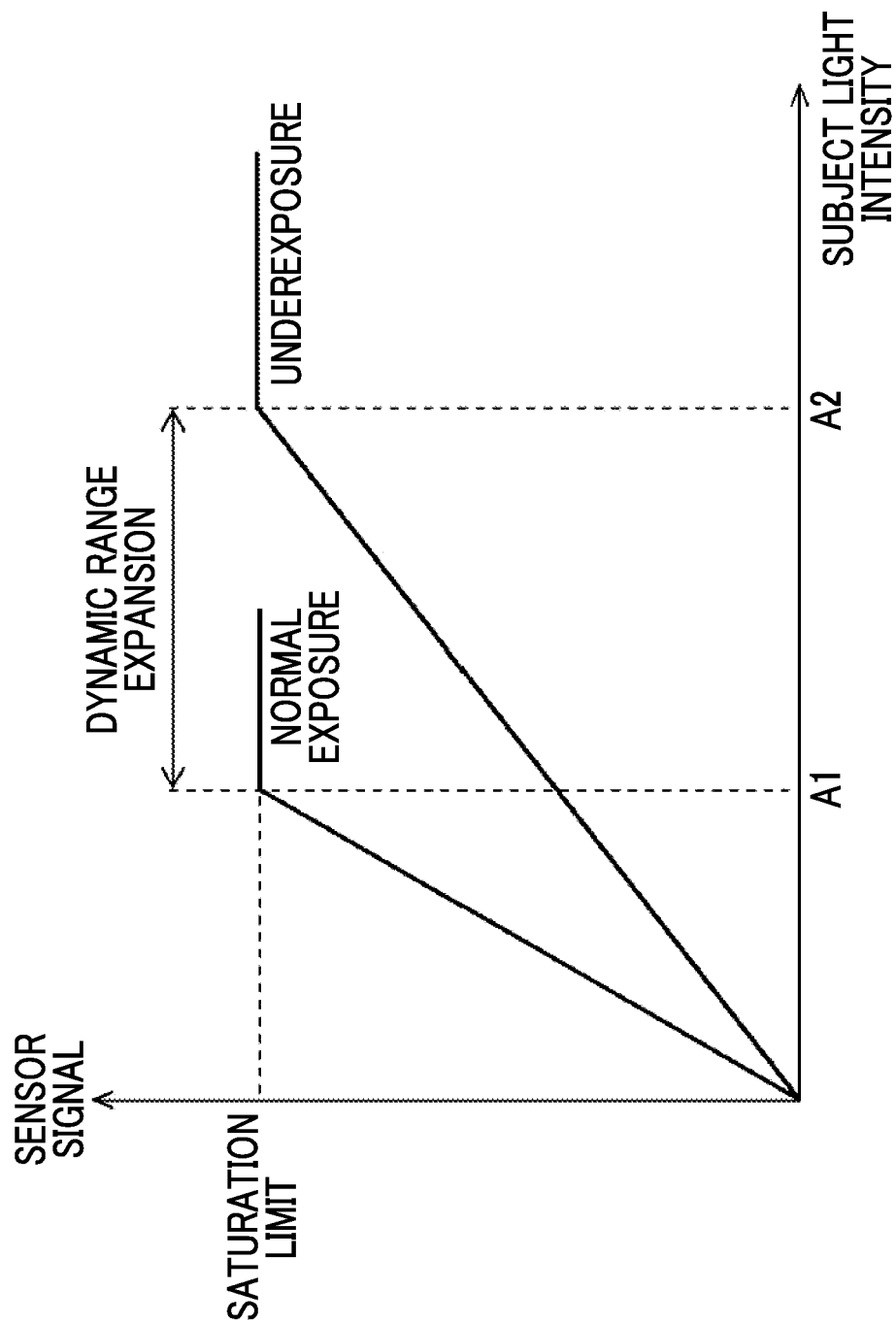
FIG. 8 is a diagram conceptually illustrating a relationship between a subject light intensity and a sensor signal in normal exposure and underexposure.

FIG. 8 is a diagram conceptually illustrating a relationship between a subject light intensity and a sensor signal in normal exposure and underexposure. As illustrated in FIG. 8, capturing the captured image in the underexposure can provide gradations to an output of the sensor signal even on the highlight side, compared to capturing in the normal exposure. Specifically, in a range of a subject light intensity of A1 to A2, pixels that reach a saturation limit in the normal exposure are set to have gradations by imaging in the underexposure. That is, a dynamic range can be expanded in the range of the subject light intensity of A1 to A2. The dynamic range is a ratio of a maximum value to a minimum value of an identifiable signal.

In a case where the width of decrease of the exposure is increased, a case where a sensor cannot read out a signal of the shadow region, or a case where noise and a signal of the subject are not distinguished due to a level of an input signal reaching a noise limit occurs. In such a case, a black solid occurs even in a case where the signal of the shadow region is increased by applying a tone curve.

Figure 9:
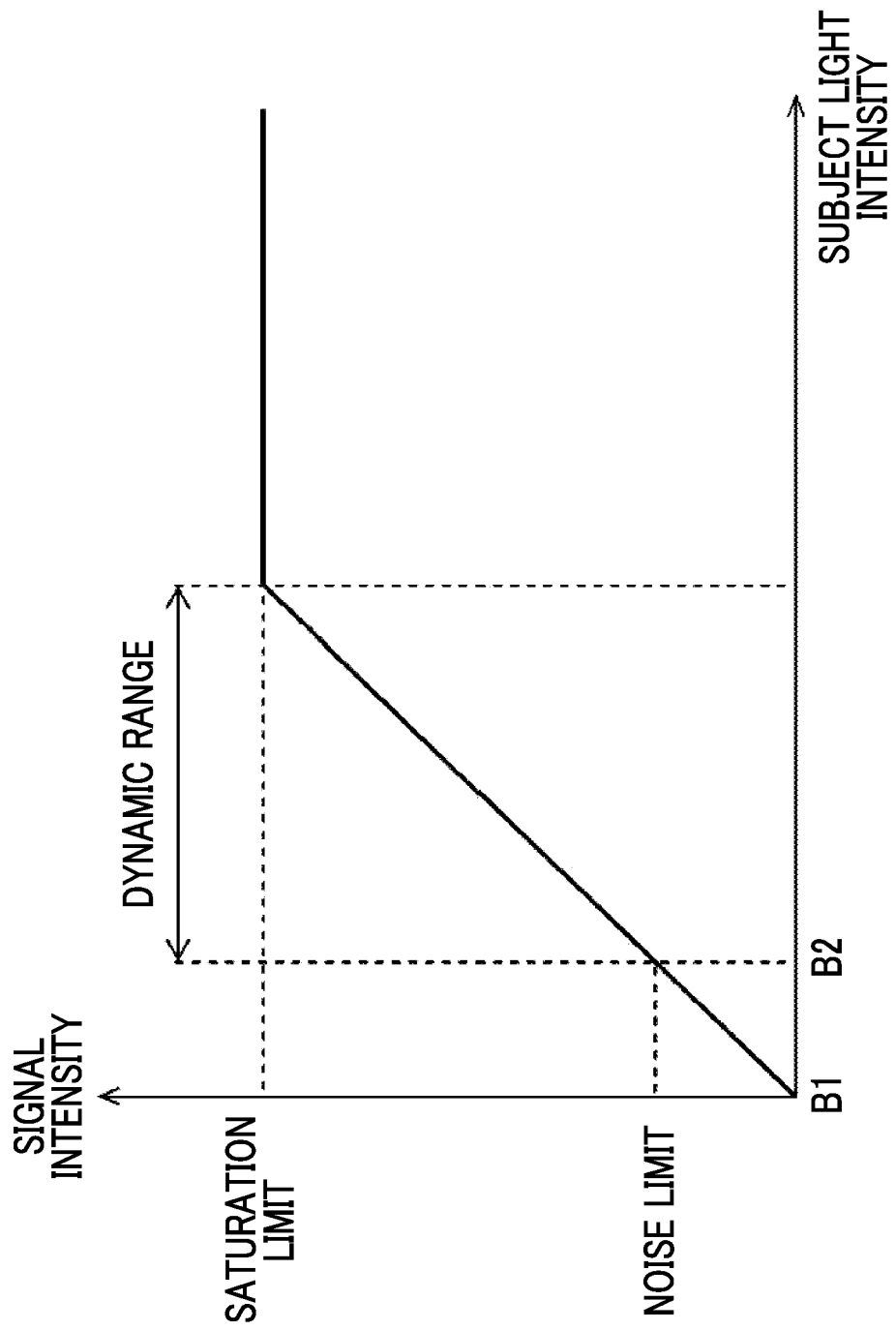
FIG. 9 is a diagram describing a noise limit.

FIG. 9 is a diagram describing the noise limit and illustrates a signal intensity with respect to the subject light intensity. In the case illustrated in FIG. 9, imaging is performed by the underexposure, and the signal intensity is lower than or equal to the noise limit in a range of the subject light intensity of B1 to B2. In such a case, the signal intensity corresponding to the subject light intensity of B1 to B2 is subjected to a black solid, and it is difficult to provide gradations even in a case where a gain is applied by signal processing. Accordingly, in the captured image acquired by the underexposure, a black solid of pixels of the shadow region occurs.

Next, the application of the tone curve in the dynamic range expansion process will be described.

Figure 10:
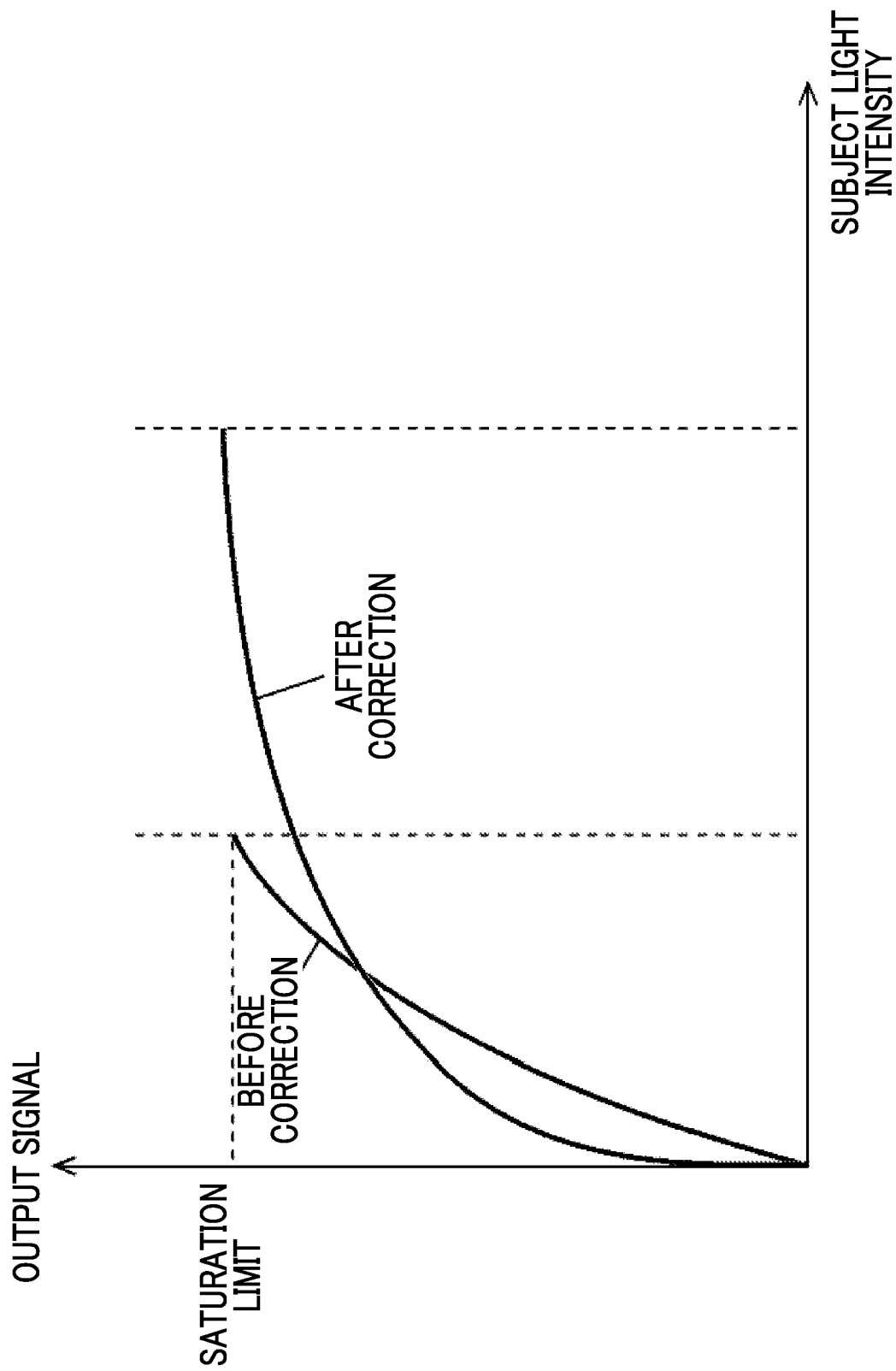
FIG. 10 is a diagram describing correction of an output signal by a tone curve.

FIG. 10 is a diagram describing correction of an output signal by the tone curve. In the case illustrated in FIG. 10, the output signal having appropriate brightness is obtained by performing the dynamic range expansion process by applying the tone curve to the input signal such that a black solid of the shadow region and a white void of the highlight region are reduced. That is, correction that increases a value of the output signal is performed in the shadow region, and correction that decreases the value of the output signal is performed in the highlight region.

A range of the subject light intensity in which gradations are provided can be controlled by changing a shape of the tone curve. For example, in a case where a contrast ratio of the highlight region to the shadow region is high as in a backlight scene, an impression of an output image significantly changes depending on a brightness range in which the number of gradations is increased. Thus, it is necessary to decide the tone curve such that the imaging intention of the user is reflected, depending on a range of brightness in which the user desires to increase the number of gradations.

Figure 11:
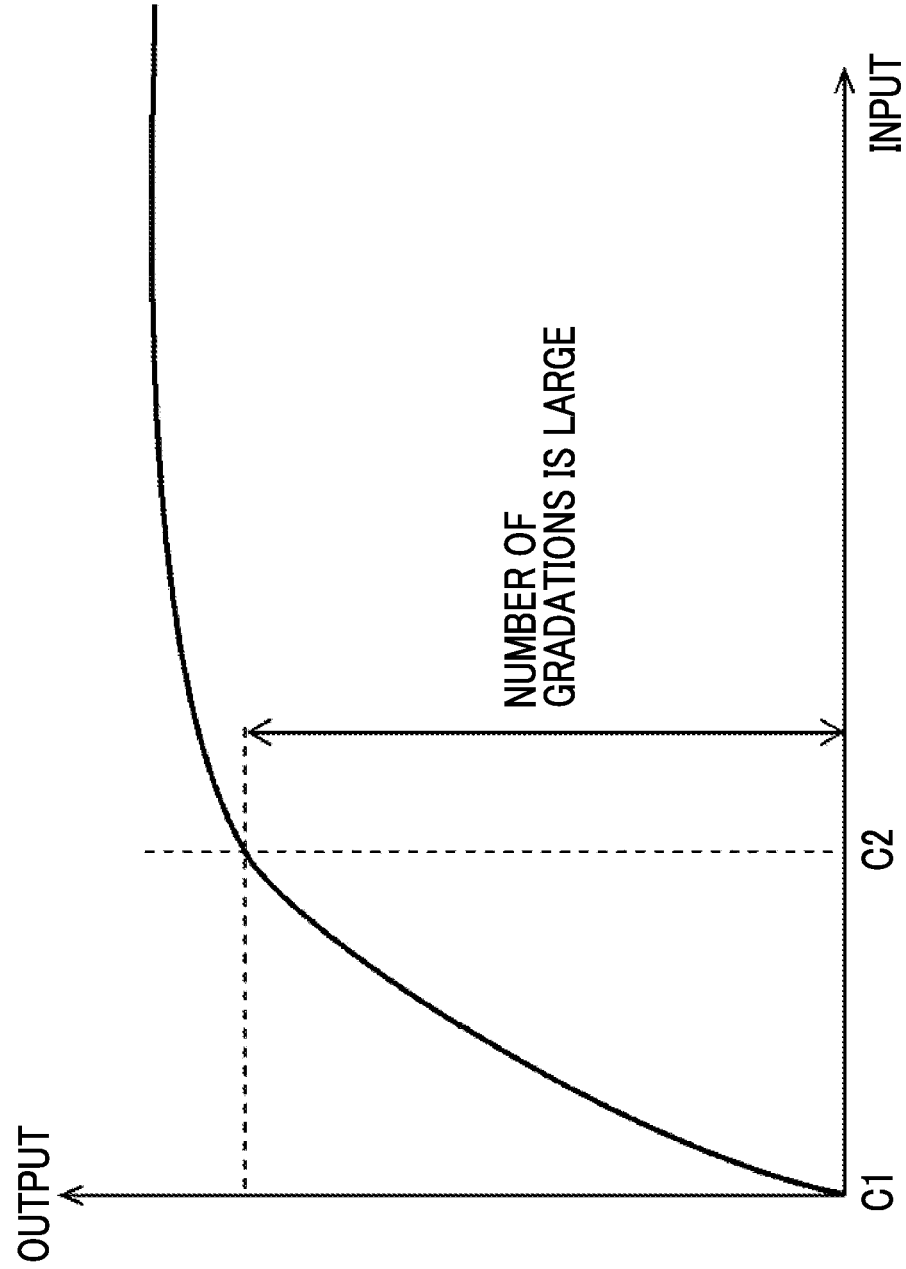
FIG. 11 is a diagram illustrating the tone curve.
Figure 12:
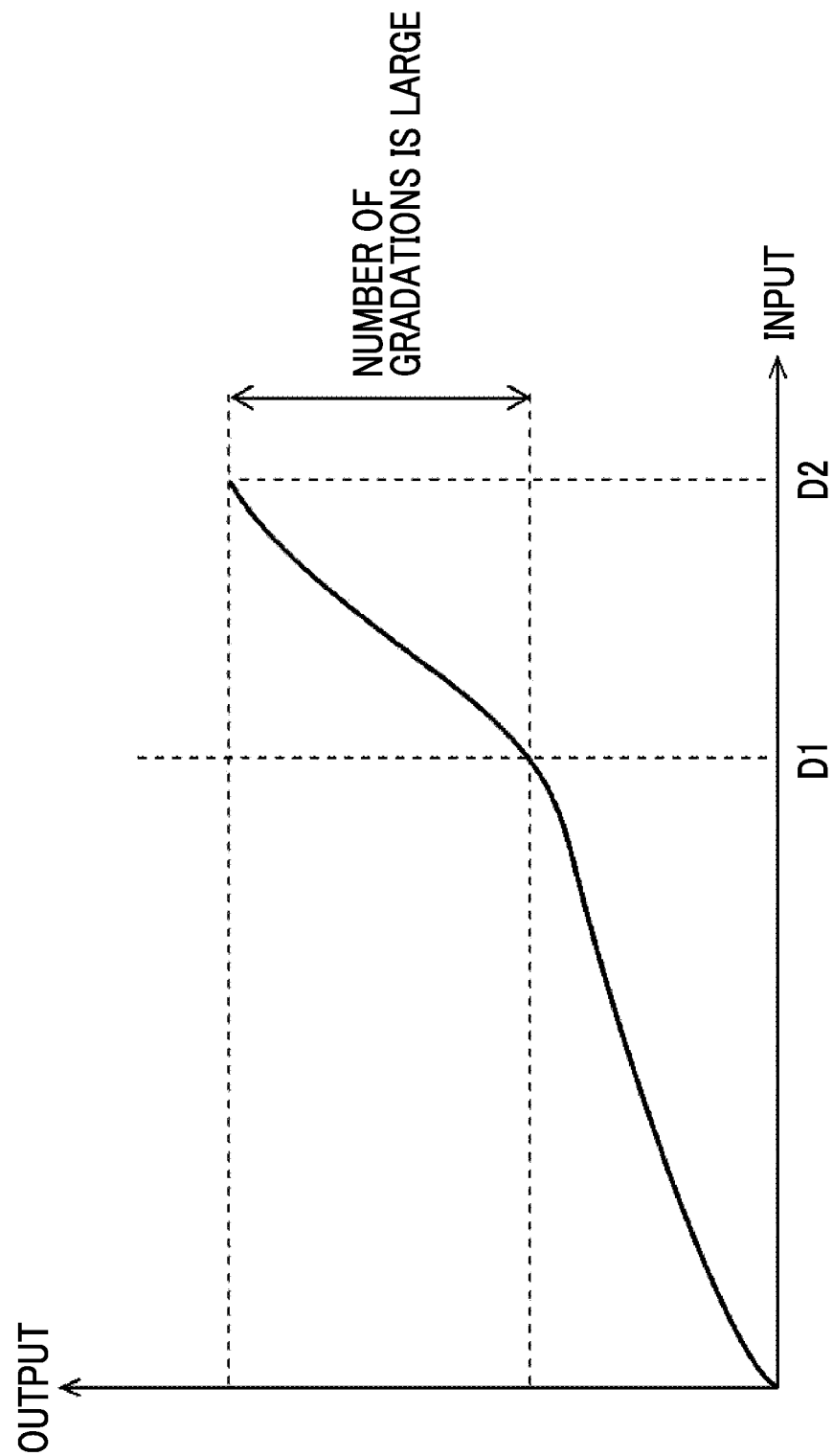
FIG. 12 is a diagram illustrating the tone curve.

FIG. 11 and FIG. 12 are diagrams illustrating the tone curve and illustrate the tone curve in a case where the input signal is output. In FIG. 11, the tone curve that provides gradations on the shadow side is illustrated. That is, the tone curve is designed to increase the number of gradations at an input value C1 to C2 of the shadow side. In FIG. 12, the tone curve that provides gradations on the highlight side is illustrated. That is, the tone curve is designed to increase the number of gradations at an input value D1 to D2 of the highlight side. The shape of the tone curve is different between a case of providing gradations on the shadow side and a case of providing gradations on the highlight side. By selecting the tone curve having an appropriate shape corresponding to the priority region, the user can obtain the captured image on which the imaging intention is reflected.

Use of the decided priority region will be described in the following description. In a second embodiment, a case where the exposure control is performed based on the priority region will be described. In a third embodiment, a case where the white balance correction process is performed based on the priority region will be described. In a fourth embodiment, a case where the tone curve is decided based on the priority region will be described.

Second Embodiment

Figure 13:
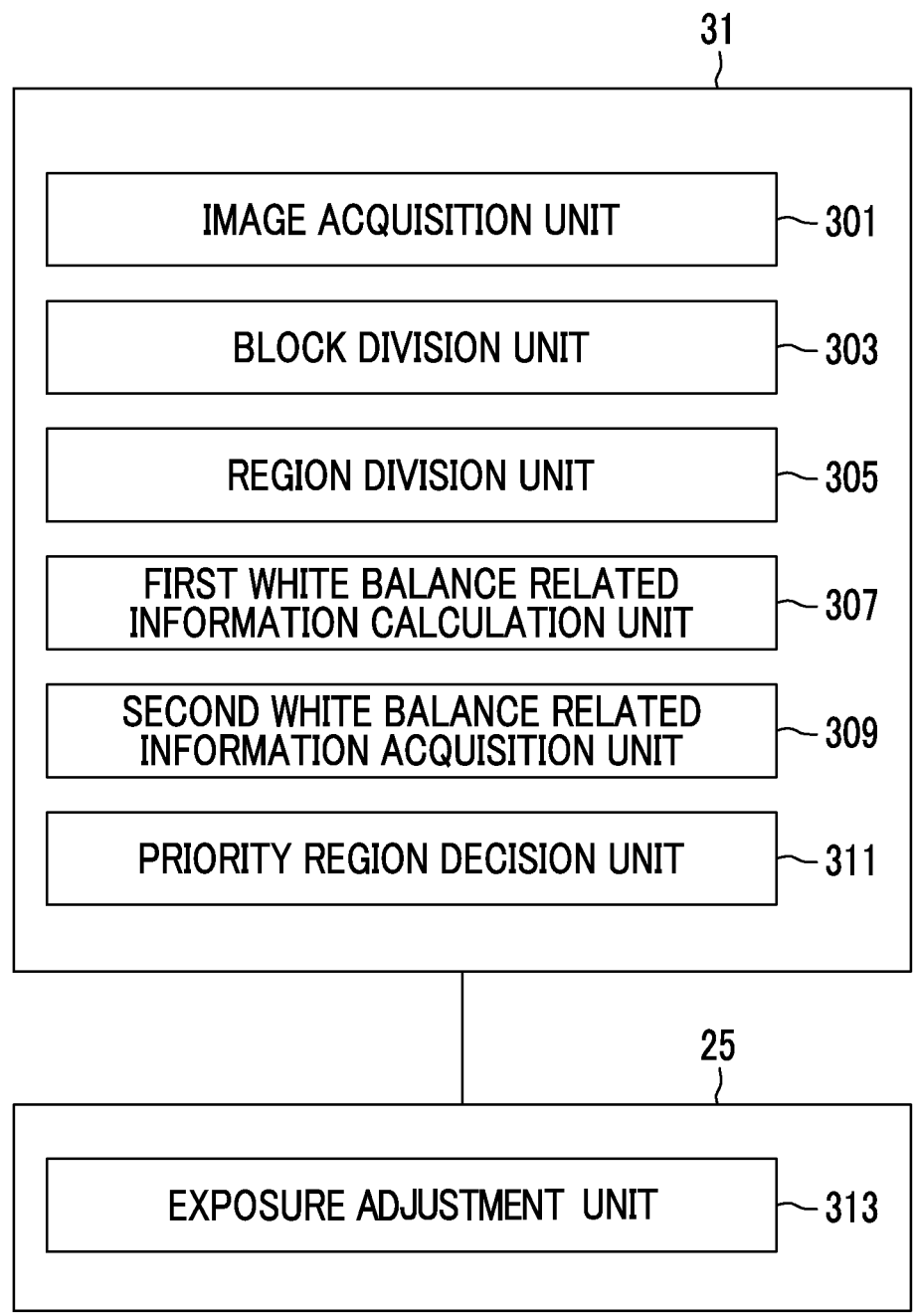
FIG. 13 is a diagram illustrating function blocks constituting the image processing unit and a system control unit.

The digital camera 2 of the second embodiment of the present invention will be described. FIG. 13 is a diagram illustrating function blocks constituting the image processing unit 31 and the system control unit 25 of the digital camera 2 of the present embodiment.

The image processing unit 31 mounted in the digital camera 2 of the present embodiment comprises the image acquisition unit 301, the block division unit 303, the region division unit 305, the first white balance related information calculation unit 307, the second white balance related information acquisition unit 309, and the priority region decision unit 311. In addition, the system control unit 25 mounted in the digital camera 2 of the present embodiment comprises an exposure adjustment unit 313. Points already described in FIG. 4 will be designated by the same reference signs, and descriptions of such points will not be repeated.

The image acquisition unit 301 acquires the live view image from the main memory 24. In the present embodiment, the priority region is decided based on the live view image. That is, the priority region is decided by performing the process described in the first embodiment on the live view image acquired by the image acquisition unit 301.

The exposure adjustment unit 313 adjusts the exposure depending on the priority region. That is, the exposure adjustment unit 313 adjusts the exposure by controlling the shutter speed, the stop, and/or ISO sensitivity of the imaging element depending on the priority region. Specifically, in a case where the priority region is on the highlight side more than the threshold value, the exposure adjustment unit 313 controls the exposure depending on white void pixels of the captured image. In a case where the priority region is on the shadow side less than or equal to the threshold value, the exposure adjustment unit 313 controls the exposure depending on black solid pixels of the captured image.

Figure 14:
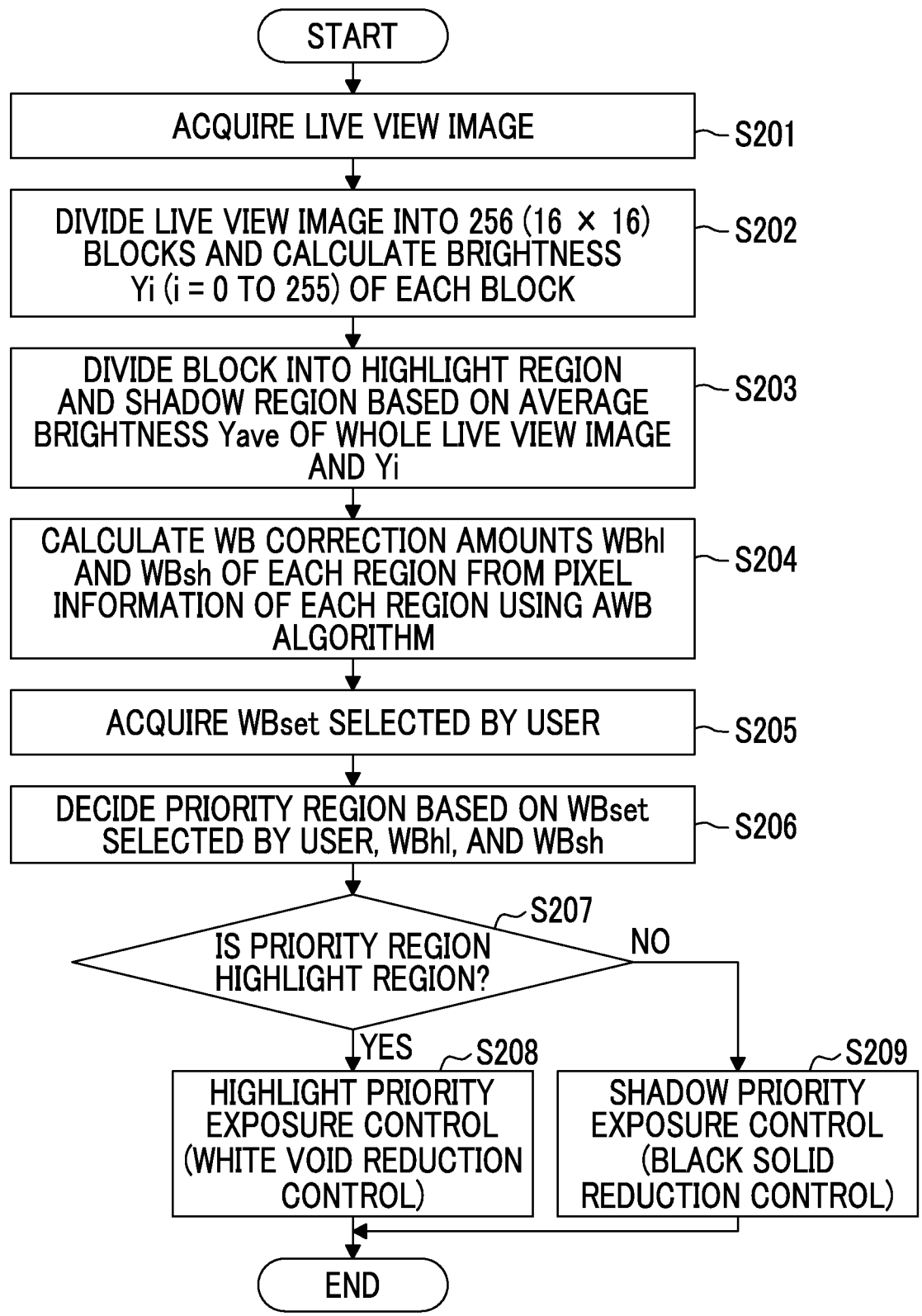
FIG. 14 is a diagram illustrating an operation flow of the digital camera.

FIG. 14 is a diagram illustrating an operation flow of the digital camera 2 of the present embodiment.

First, the digital camera 2 acquires the live view image (step S201: image acquisition step). That is, the image acquisition unit 301 of the image processing unit 31 of the digital camera 2 acquires the live view image from the main memory 24. Then, the block division unit 303 divides the acquired live view image into 256 (vertically 16×horizontally 16) blocks and calculates the brightness Yi (i=0 to 255) for each block (step S202).

Next, the region division unit 305 divides each block into the highlight region and the shadow region based on the average brightness Yave of the whole live view image and Yi (step S203: region division step).

Then, the white balance correction amount WBhl of the highlight region and the white balance correction amount WBsh of the shadow region in each region are calculated from pixel information of each region using the well-known auto white balance (AWB) algorithm (step S204: first white balance related information calculation step).

The second white balance related information acquisition unit 309 acquires WBset which is the white balance related information selected by the user (imaging person) (step S205: second white balance related information acquisition step).

Next, the priority region decision unit 311 decides the priority region based on WB set, WBhl, and WBsh (step S206: priority region decision step).

Then, the exposure adjustment unit 313 determines whether or not the priority region is on the highlight side (step S207). For example, the exposure adjustment unit 313 determines whether or not the priority region is on the highlight side based on the threshold value.

In a case where the priority region is on the highlight side, the exposure adjustment unit 313 performs highlight priority exposure control (white void reduction control) (step S208: exposure adjustment step). That is, in a case where the maximum value of an R value, a G value, and a B value of the block included in the highlight region is denoted by V(max), the exposure adjustment unit 313 controls the exposure such that V(max) does not reach the saturation limit value of the sensor. The exposure adjustment unit 313 decides the sensitivity, the stop, and the shutter speed in accordance with a program line diagram of the exposure. V(max) denotes the maximum value of the block (the maximum value of the average value of each block) but is not for limitation purposes. For example, V(max) may be the maximum value of all pixels within the highlight region. In addition, a limit of V(max) is not limited to the saturation limit value and may be, for example, a value of 90% of the saturation limit value.

In a case where the priority region is not on the highlight side, that is, in a case where the priority region is on the shadow side, the exposure adjustment unit 313 performs shadow priority exposure control (black solid reduction control) (step S209: exposure adjustment step). That is, in a case where the minimum value of the R value, the G value, and the B value of the block included in the shadow region is denoted by V(min), the exposure adjustment unit 313 controls the exposure such that V(min) does not become smaller than the noise limit value of the sensor. V(min) denotes the minimum value of the block (the minimum value of the average value of each block) but is not for limitation purposes. For example, V(min) may be the minimum value of all pixels within the shadow region. In addition, a limit of V(min) is not limited to the noise limit value and may be, for example, zero or a value of 110% of the noise limit value.

Third Embodiment

Next, the image processing unit 31 of the third embodiment of the present invention will be described.

Figure 15:
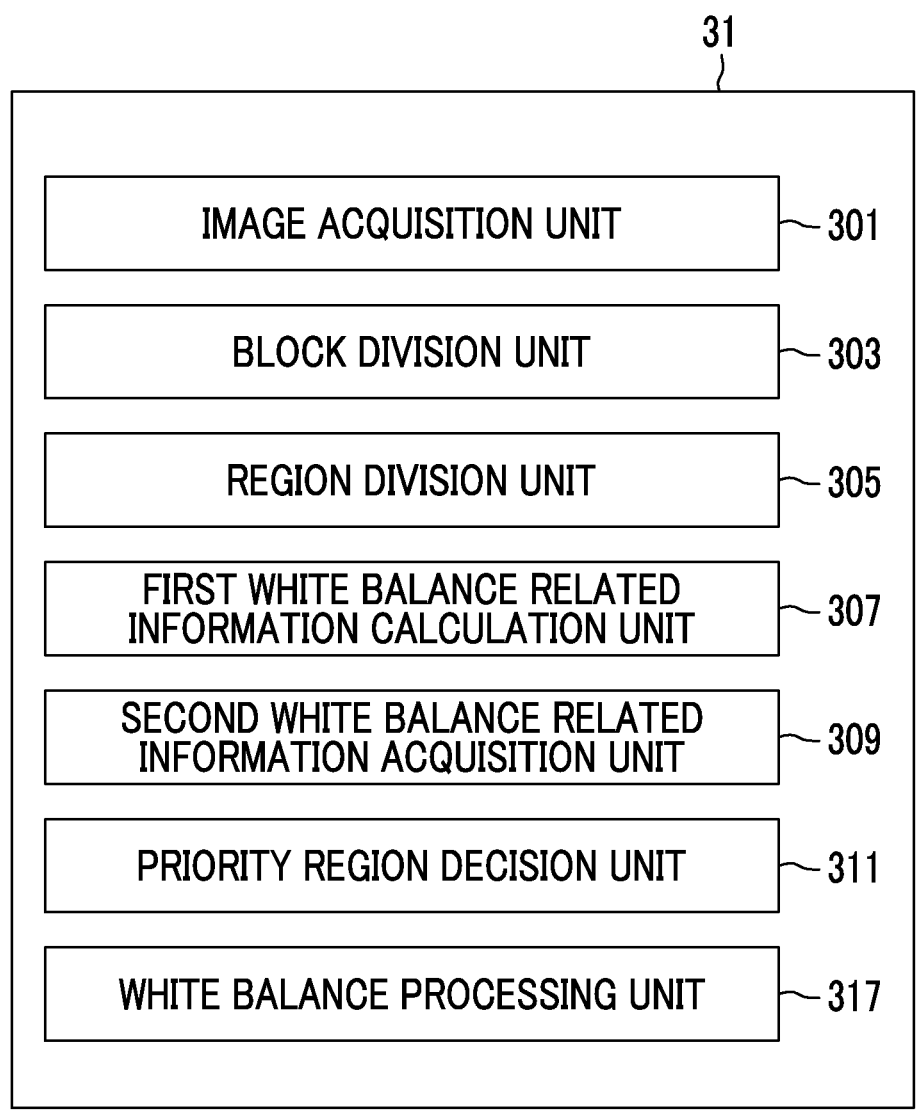
FIG. 15 is a diagram illustrating function blocks of the image processing unit.

FIG. 15 is a diagram illustrating function blocks of the image processing unit 31 of the present embodiment.

The digital camera 2 comprises the image acquisition unit 301, the block division unit 303, the region division unit 305, the first white balance related information calculation unit 307, the second white balance related information acquisition unit 309, the priority region decision unit 311, and a white balance processing unit 317. Points already described in FIG. 4 will be designated by the same reference signs, and descriptions of such points will not be repeated.

The white balance processing unit 317 performs the white balance correction process on the captured image. The white balance processing unit 317 performs the white balance correction process on the captured image based on the white balance related information (first white balance related information) calculated based on the pixel values of the captured image using the well-known algorithm and/or the white balance related information (second white balance related information) set by the user.

In addition, for example, the white balance processing unit 317 may perform the white balance correction process based on the second white balance related information in the priority region among the plurality of regions, and perform the white balance correction process based on the first white balance related information in a region other than the priority region among the plurality of regions. In addition, the white balance processing unit 317 may perform the white balance correction process using any of the first white balance related information or the second white balance related information for each pixel constituting the captured image.

Figure 16:
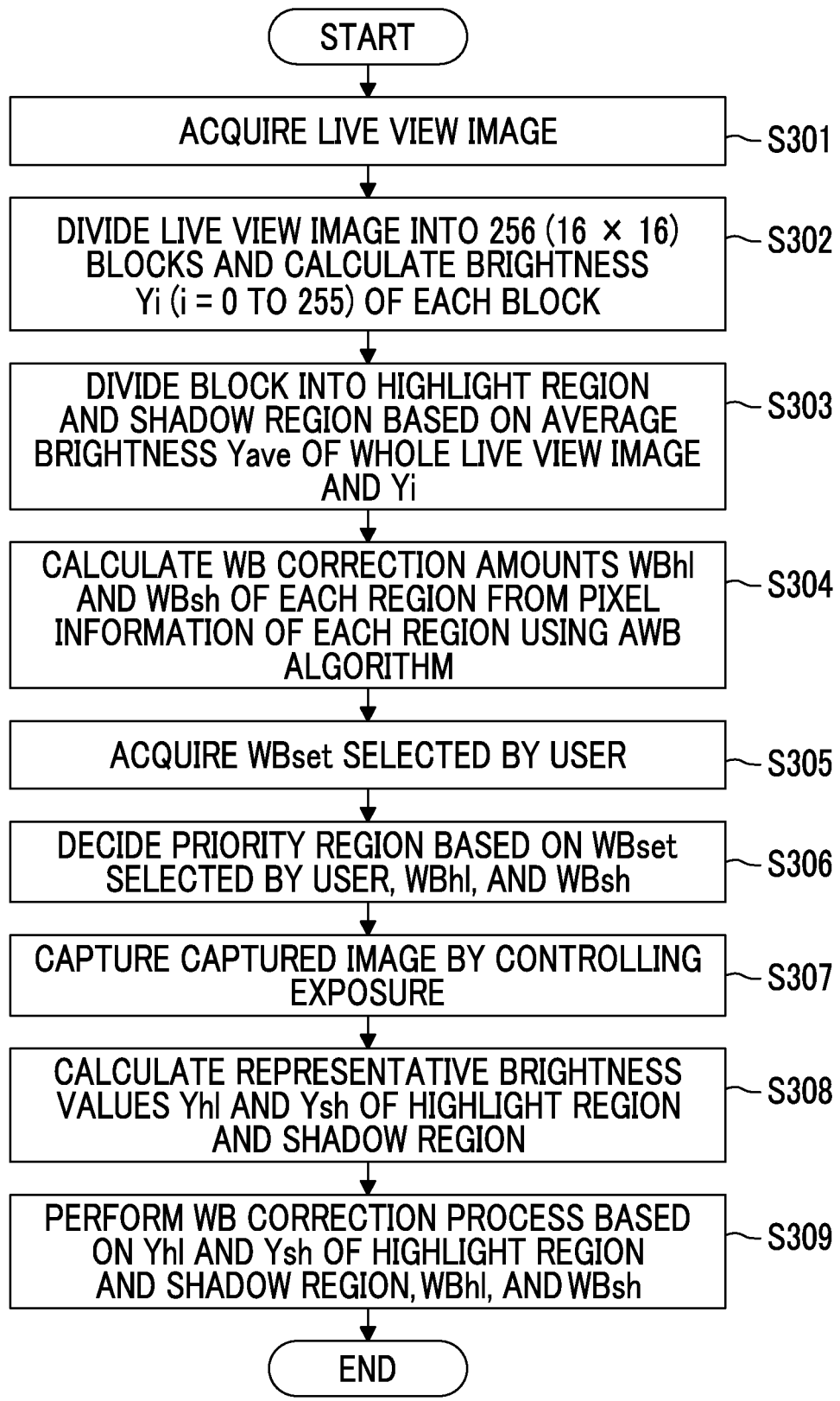
FIG. 16 is a diagram illustrating an operation flow of the digital camera.

FIG. 16 is a diagram illustrating an operation flow of the digital camera 2 in which the image processing unit 31 of the present embodiment is mounted.

First, the digital camera 2 acquires the live view image (step S301). Then, the block division unit 303 divides the acquired live view image into 256 (vertically 16×horizontally 16) blocks and calculates the brightness Yi (i=0 to 255) for each block (step S302).

Next, the region division unit 305 divides each block into the highlight region and the shadow region based on the average brightness Yave of the whole live view image and Yi (step S303).

Then, the white balance correction amount WBhl of the highlight region and the white balance correction amount WBsh of the shadow region are calculated from pixel information of each region using the auto white balance (AWB) algorithm (step S304).

The second white balance related information acquisition unit 309 acquires WBset which is the white balance related information selected by the user (imaging person) (step S305).

Next, the priority region decision unit 311 decides the priority region based on WBset, WBhl, and WBsh (step S306).

Next, the digital camera 2 captures the captured image by performing the exposure control (step S307). In the exposure control performed by the digital camera 2, the exposure control described in the second embodiment may be performed, or a well-known exposure control technology may be applied.

Then, the white balance processing unit 317 performs the white balance correction process on the acquired captured image. The white balance processing unit 317 calculates representative brightness of each of the highlight region and the shadow region (step S308) and performs the white balance correction process based on the representative brightness (step S309).

Figure 17:
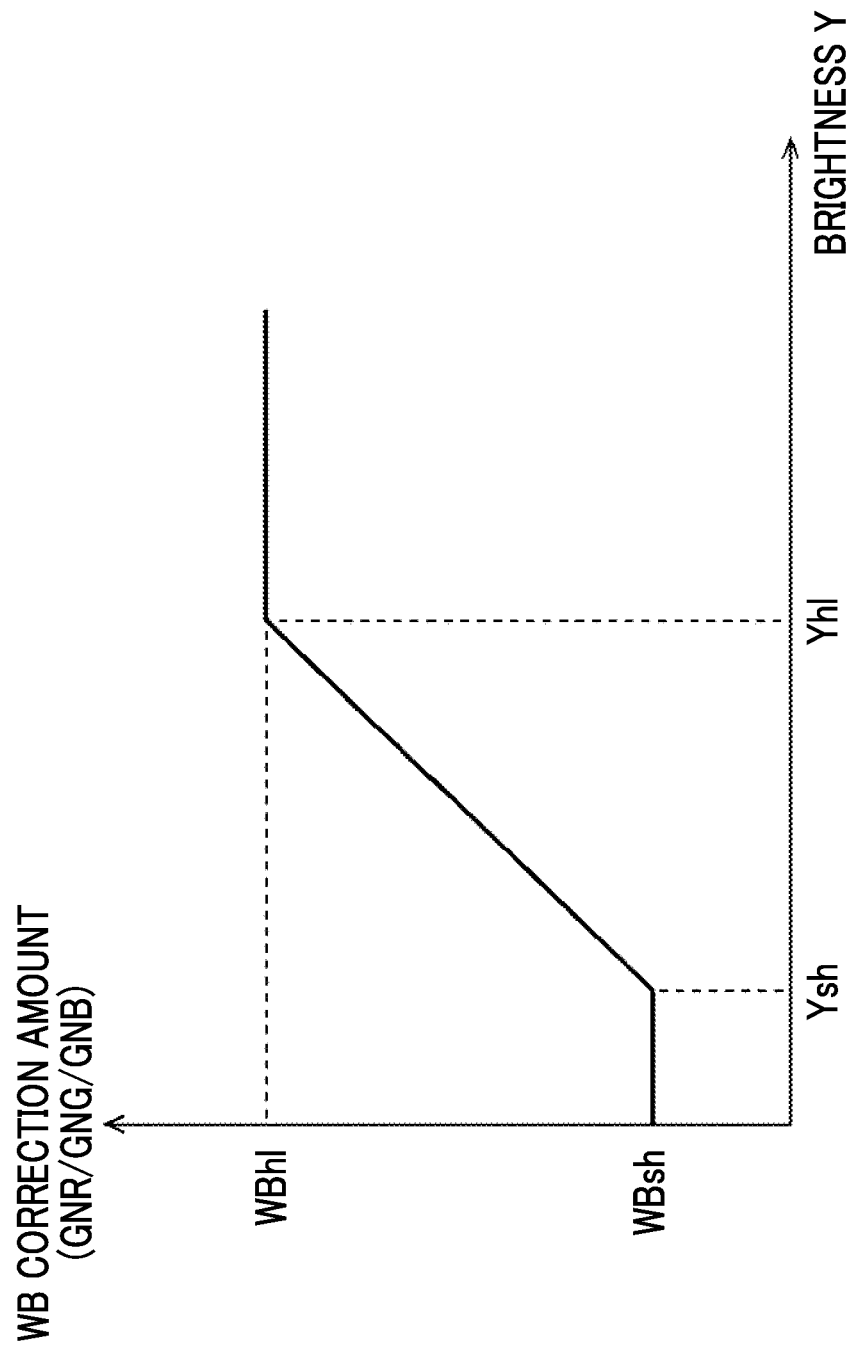
FIG. 17 is a diagram illustrating one example of a white balance correction amount.

FIG. 17 is a diagram illustrating one example of the white balance (WB) correction amount corresponding to brightness Y. In the example illustrated in FIG. 17, in a case where average brightness of the blocks or pixels included in each region is denoted by $Y_{hl}$ and $Y_{sh}$ and the brightness of each pixel in the image is denoted by $YP_j$ [j=0 to the number of pixels−1], the white balance processing unit 317 calculates a white balance correction amount $WBP_j$ [j=0 to the number of pixels−1] to be applied to each pixel.

$$WBP_j = WB_{sh} (YP_j \leq Y_{sh})$$

$$WBP_j = WB_{sh} + \frac{WB_{hl} - WB_{sh}}{Y_{hl} - Y_{sh}} \times YP_j \quad (Y_{sh} < YP_j < Y_{hl})$$

$$WBP_j = WB_{hl} (YP_j \geq Y_{hl})$$

A method of calculating the representative brightness is not particularly limited as long as the method is based on the highlight region and the shadow region. The representative brightness is not limited to the average brightness and may be a center value of each region, or the maximum value of the shadow region and the minimum value of the highlight region. The representative brightness may be calculated from the actual captured image or may be calculated from a value that is obtained by reflecting a difference between temporary exposure and main exposure on a value of the temporary exposure in a case of deciding the priority region. In addition, calculation may be performed by replacing WBhl with WBset in a case where the priority region is the highlight region, and replacing WBsh with WBset in a case where the priority region is the shadow region.

Fourth Embodiment

Next, the image processing unit 31 of the fourth embodiment of the present invention will be described.

Figure 18:
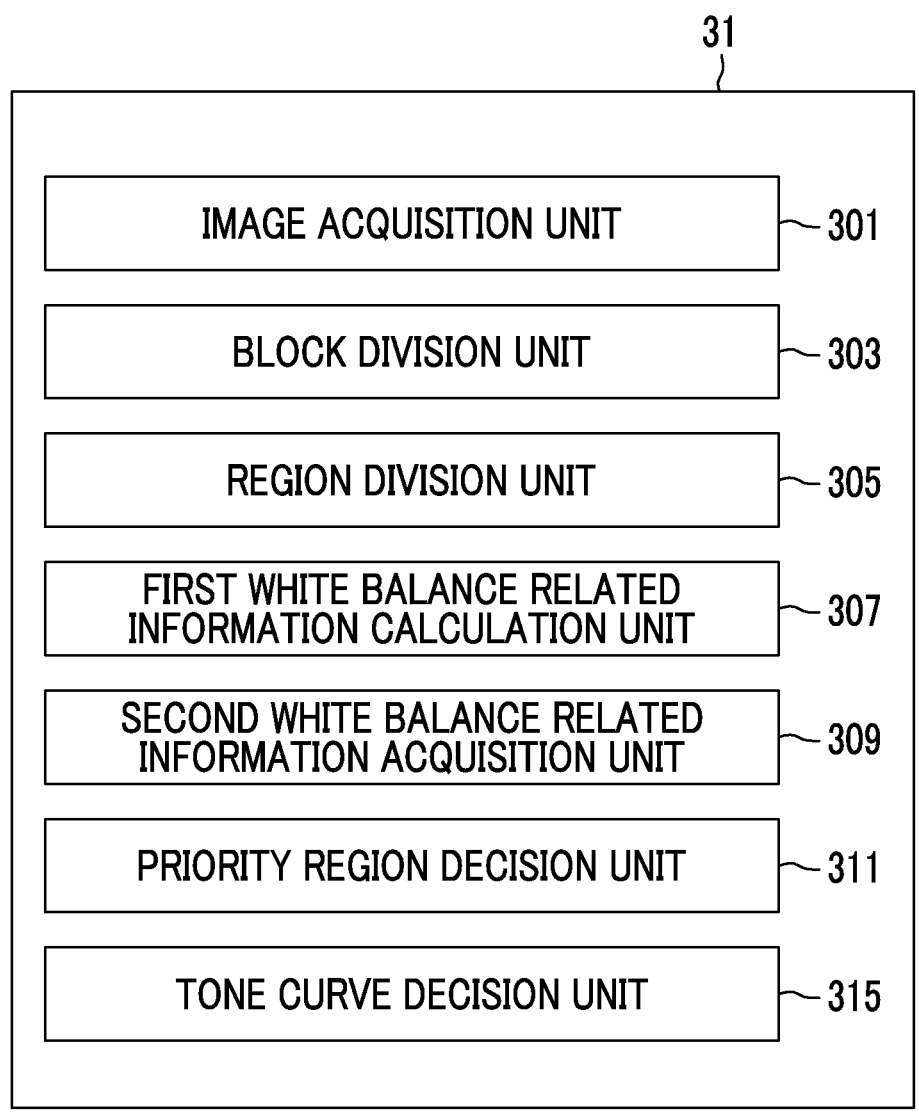
FIG. 18 is a diagram illustrating function blocks constituting the image processing unit.

FIG. 18 is a diagram illustrating function blocks constituting the image processing unit 31 of the present embodiment.

The digital camera 2 comprises the image acquisition unit 301, the block division unit 303, the region division unit 305, the first white balance related information calculation unit 307, the second white balance related information acquisition unit 309, the priority region decision unit 311, and a tone curve decision unit 315. Points already described in FIG. 4 will be designated by the same reference signs, and descriptions of such points will not be repeated.

The tone curve decision unit 315 decides the tone curve depending on the priority region. For example, the tone curve decision unit 315 decides the tone curve that appropriately sets the brightness of the priority region. Specifically, the tone curve decision unit 315 decides the tone curve such that the number of gradations is increased in a range of brightness (priority brightness range) of the priority region. The priority brightness range may be a single value such as the average value or the center value within the priority region. In addition, the priority brightness range may be obtained using a method of deciding a range from the minimum value to the maximum value of the brightness within the priority region, a method of deciding the priority brightness range from a histogram of the brightness value within the priority region (for example, a range of 80% of the whole data constituting the histogram), or the like.

Figure 19:
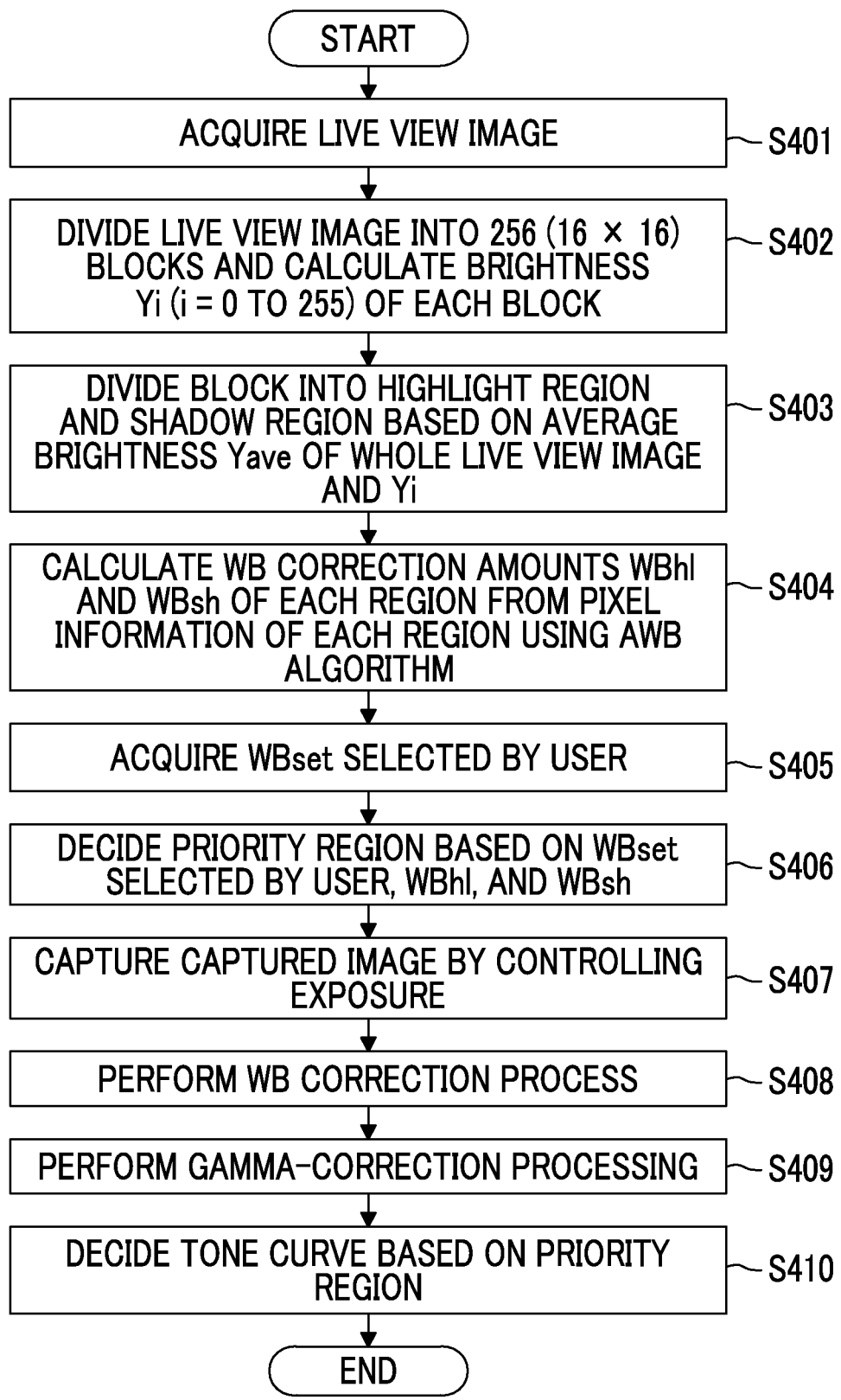
FIG. 19 is a diagram illustrating an operation flow of the digital camera.

FIG. 19 is a diagram illustrating an operation flow of the digital camera 2 in which the image processing apparatus of the present embodiment is mounted.

First, the digital camera 2 acquires the live view image (step S401). Then, the block division unit 303 divides the acquired live view image into 256 (vertically 16×horizontally 16) blocks and calculates the brightness Yi (i=0 to 255) for each block (step S402).

Next, the region division unit 305 divides each block into the highlight region and the shadow region based on the average brightness Yave of the whole live view image and Yi (step S403).

Then, the white balance correction amount WBhl of the highlight region and the white balance correction amount WBsh of the shadow region are calculated from pixel information of each region using the auto white balance (AWB) algorithm (step S404).

The second white balance related information acquisition unit 309 acquires WBset which is the white balance related information selected by the user (imaging person) (step S405).

Next, the priority region decision unit 311 decides the priority region based on WBset selected by the user, WBhl, and WBsh (step S406).

Next, the digital camera 2 captures the captured image by performing the exposure control (step S407). In the exposure control performed by the digital camera 2, the exposure control described in the second embodiment may be performed, or a well-known exposure control technology may be applied.

The image processing unit 31 performs the white balance (WB) correction process on the captured image (step S408). The white balance correction process described in the third embodiment may be performed, or another white balance correction process may be performed. For example, as the other white balance correction process, the white balance correction amount selected by the user may be applied, or a different white balance correction amount may be applied to each of the highlight region and the shadow region. In the following description, an RGB value after the white balance correction process will be denoted by (R(1), G(1), B(1)).

Then, the image processing unit 31 performs gamma-correction processing (step S409). For example, in a case the image processing unit 31 conforms with an sRGB standard and a value obtained by normalization by dividing (R(1), G(1), B(1)) by a maximum data value Vbit (16383 in a case of 14 bits) is denoted by (r(1), g(1), b(1)), the RGB value (R(2), G(2), B(2)) after γ correction is calculated using the following expression.

$$R(2) = \begin{cases} 12.92 r(1) \times V_{bit} & (r(1) \leq 0.0031308) \\ \left(1.055 r(1)^{1/2.4} - 0.055\right) \times V_{bit} & (r(1) > 0.0031308) \end{cases}$$

The image processing unit 31 processes G(2) and B(2) in the same manner as R(2).

Next, the image processing unit 31 converts the RGB value after gamma correction into brightness using the following expression.

$$Y(2) = 0.3 R(2) + 0.6 G(2) + 0.1 B(2)$$

Next, the tone curve decision unit 315 decides the priority brightness range based on the priority region (step S410). For example, the tone curve decision unit 315 calculates a maximum value of brightness Y(2) of the blocks included in the priority region (the highlight region or the shadow region) as Y(2)max and a minimum value of the brightness Y(2) as Y(2)min and determines the priority brightness range as Y(2)min to Y(2)max.

Figure 20:
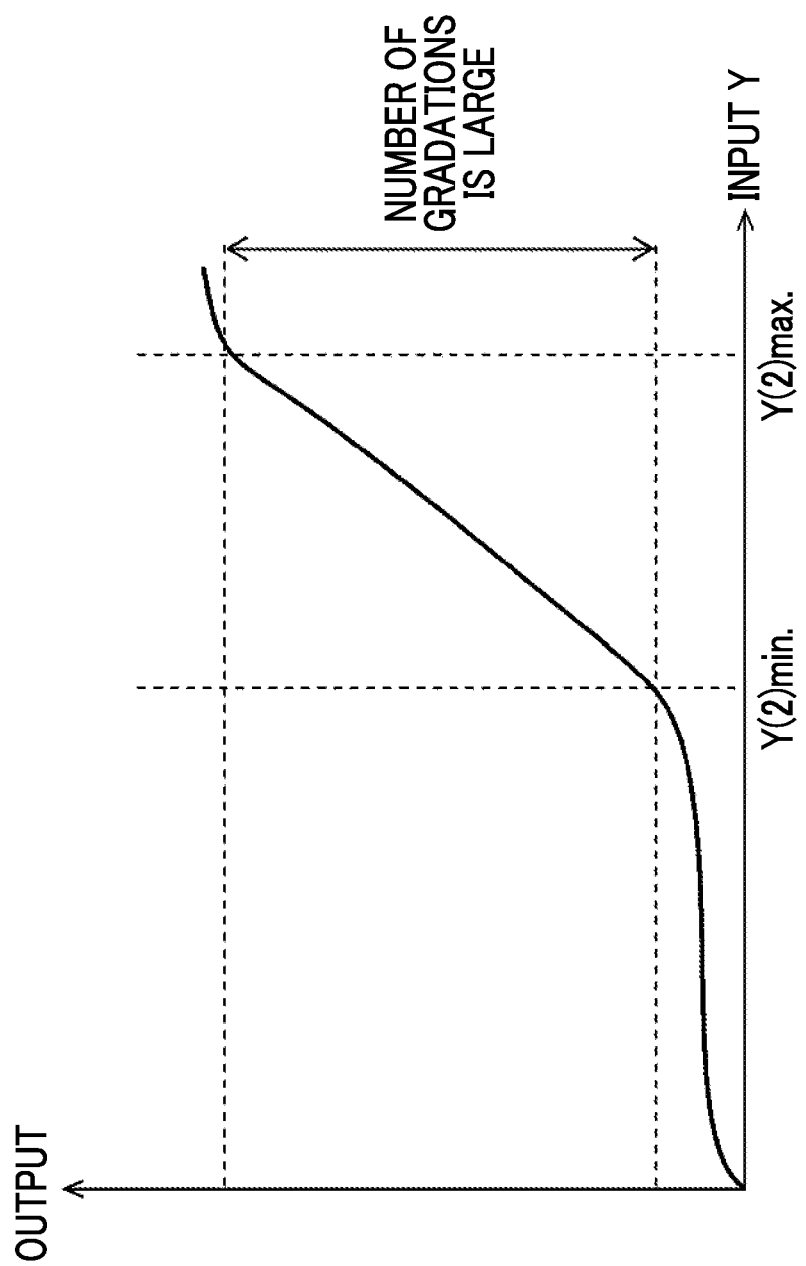
FIG. 20 is a diagram illustrating an example of the tone curve.
Figure 21:
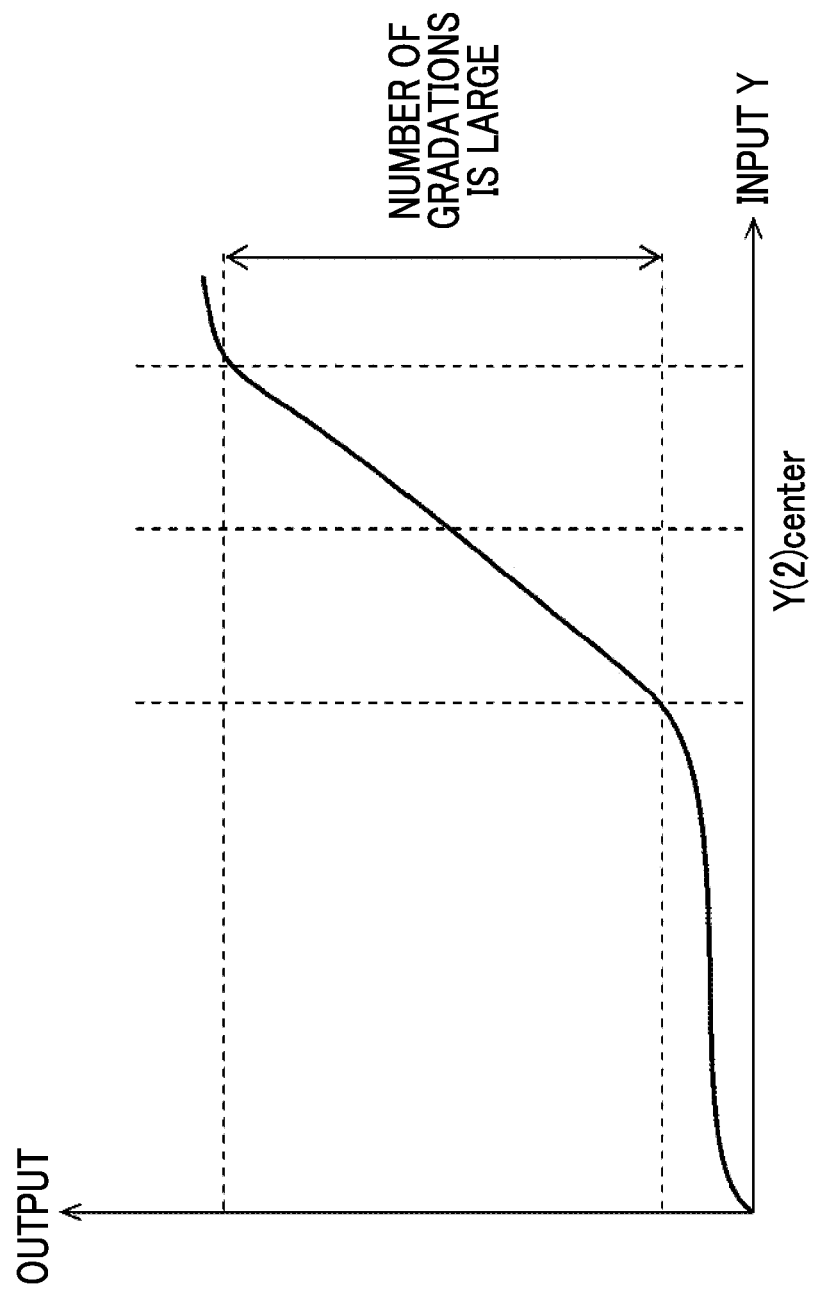
FIG. 21 is a diagram illustrating an example of the tone curve.

The tone curve decision unit 315 decides the tone curve based on the priority brightness range. FIG. 20 and FIG. 21 are diagrams illustrating examples of the tone curve. In a case where the priority brightness range is the range of Y(2)min to Y(2)max, a tone curve in which the curve is steep from Y(2)min to Y(2)max as in FIG. 20 is selected or newly created. In a case where the priority brightness range is determined as single representative brightness Y(2)center such as the average brightness of the priority region, a tone curve in which the curve is steep near Y(2)center as in FIG. 21 is selected or newly created.

<Configuration of Smartphone>

Figure 22:
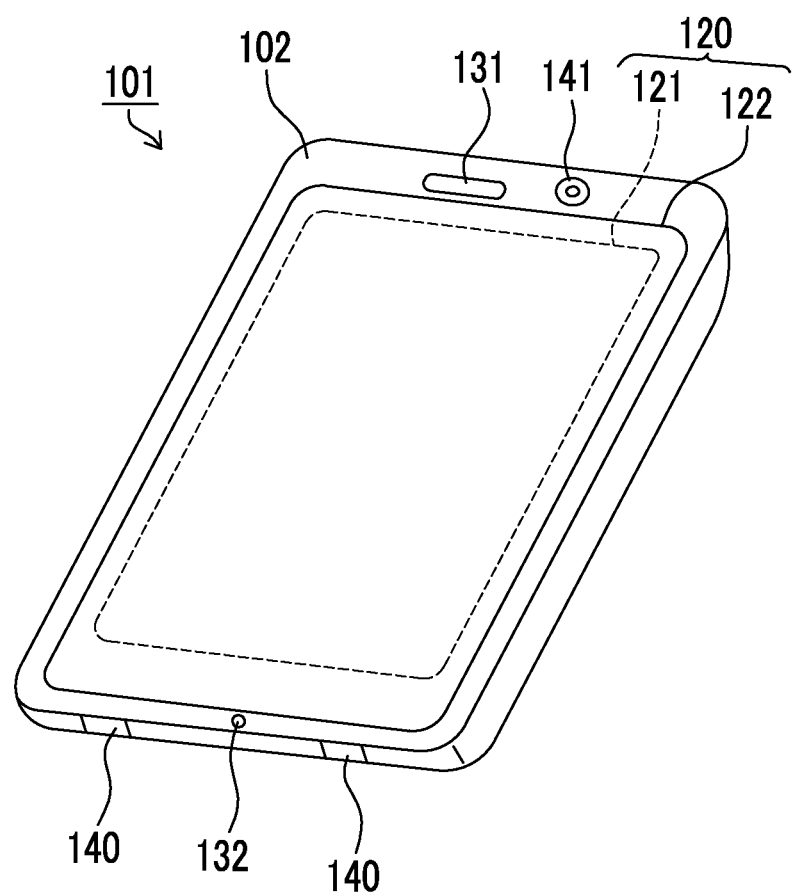
FIG. 22 is a diagram illustrating an exterior of a smartphone.

FIG. 22 is a diagram illustrating an exterior of a smartphone 101. The smartphone 101 illustrated in FIG. 22 includes a casing 102 having a flat plate shape and comprises a display and input unit 120 in which a display panel 121 as a display unit and an operation panel 122 as an input unit are integrated on one surface of the casing 102. In addition, the casing 102 comprises a speaker 131, a microphone 132, an operation unit 140, and a camera unit 141. The configuration of the casing 102 is not for limitation purposes. For example, a configuration in which the display unit and the input unit are independent may be employed, or a configuration having a folded structure or a sliding mechanism may be employed.

Figure 23:
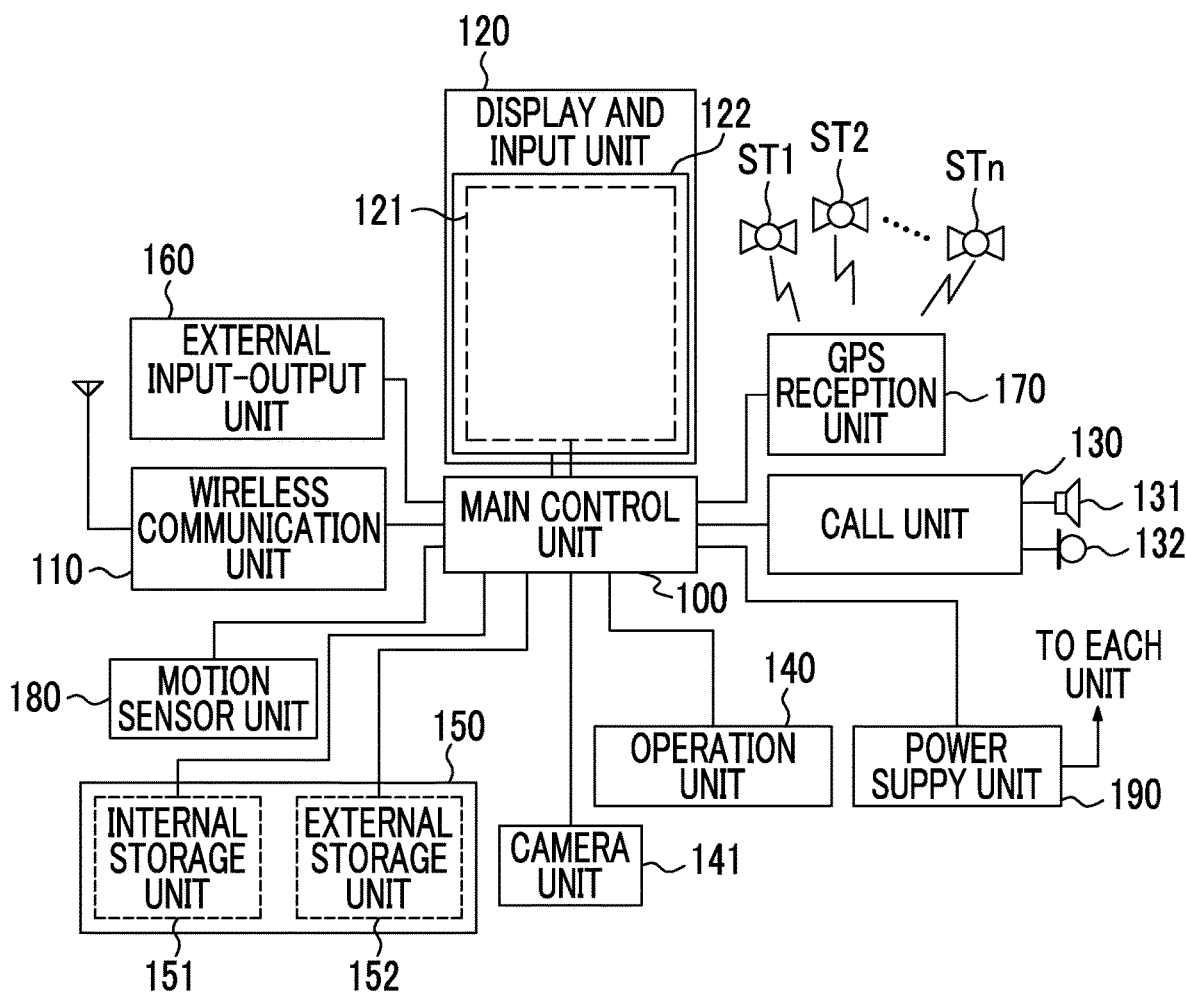
FIG. 23 is a block diagram illustrating a configuration of the smartphone illustrated in FIG. 22.

FIG. 23 is a block diagram illustrating a configuration of the smartphone 101 illustrated in FIG. 22. As illustrated in FIG. 23, a wireless communication unit 110, the display and input unit 120, a call unit 130, the operation unit 140, the camera unit 141, a storage unit 150, an external input-output unit 160, a global positioning system (GPS) reception unit 170, a motion sensor unit 180, a power supply unit 190, and a main control unit 100 are comprised as main constituents of the smartphone. In addition, a wireless communication function of performing mobile wireless communication with a base station apparatus through a mobile communication network is provided as a main function of the smartphone 101.

The wireless communication unit 110 performs wireless communication with the base station apparatus accommodated in the mobile communication network in accordance with an instruction from the main control unit 100. Transmission and reception of various file data such as voice data and image data, electronic mail data, and the like and reception of Web data, streaming data, and the like are performed using the wireless communication.

The display and input unit 120 is a so-called touch panel that visually delivers information to the user by displaying images (still images and motion images), text information, and the like and detects a user operation with respect to the displayed information under control of the main control unit 100. The display and input unit 120 comprises the display panel 121 and the operation panel 122.

The display panel 121 uses a liquid crystal display (LCD), an organic electro-luminescence display (OELD), or the like as a display device. The operation panel 122 is a device that is placed such that an image displayed on a display surface of the display panel 121 can be visually perceived, and that detects coordinates operated by a finger of the user or a stylus. In a case where the device is operated by the finger of the user or the stylus, a detection signal generated by the operation is output to the main control unit 100. Next, the main control unit 100 detects an operation position (coordinates) on the display panel 121 based on the received detection signal.

As illustrated in FIG. 22, the display panel 121 and the operation panel 122 of the smartphone 101 illustrated as the digital camera 2 according to one embodiment of the present invention are integrated and constitute the display and input unit 120. The operation panel 122 is arranged to completely cover the display panel 121. In a case of employing such arrangement, the operation panel 122 may have a function of detecting the user operation even in a region outside the display panel 121. In other words, the operation panel 122 may comprise a detection region (hereinafter, referred to as a "display region") for a superimposition part overlapping with the display panel 121 and a detection region (hereinafter, referred to as a "non-display region") for a periphery part not overlapping with the display panel 121.

While a size of the display region and a size of the display panel 121 may completely match, it is not necessary to match both sizes. In addition, the operation panel 122 may comprise two sensitive regions of the periphery part and an inner part. Furthermore, a width of the periphery part is appropriately designed depending on a size and the like of the casing 102. Furthermore, as a position detection method employed by the operation panel 122, a matrix switch method, a resistive film method, a surface acoustic wave method, an infrared method, an electromagnetic induction method, an electrostatic capacitive method, and the like are exemplified, and any of the methods can be employed.

The call unit 130 comprises the speaker 131 and the microphone 132. The call unit 130 converts voice of the user input through the microphone 132 into voice data processable in the main control unit 100 and outputs the voice data to the main control unit 100. The call unit 130 decodes voice data received by the wireless communication unit 110 or the external input-output unit 160 and outputs the decoded voice data from the speaker 131. In addition, as illustrated in FIG. 22, for example, the speaker 131 can be mounted on the same surface as the surface on which the display and input unit 120 is disposed, and the microphone 132 can be mounted on a side surface of the casing 102.

The operation unit 140 is a hardware key using a key switch or the like and receives an instruction from the user. For example, as illustrated in FIG. 22, the operation unit 140 is a push-button type switch that is mounted on a side surface of the casing 102 of the smartphone 101 and is switched ON in a case where the operation unit 140 is pushed with the finger or the like, and is switched OFF by restoring force of a spring or the like in a case where the finger is released.

The storage unit 150 stores a control program and control data of the main control unit 100, application software, address data in which a name, a telephone number, and the like of a communication counterpart are associated, data of transmitted and received electronic mails, Web data downloaded by Web browsing, and downloaded contents data, and temporarily stores streaming data and the like. In addition, the storage unit 150 is configured with an internal storage unit 151 incorporated in the smartphone and an external storage unit 152 that includes a slot for an attachable and detachable external memory. The each of the internal storage unit 151 and the external storage unit 152 constituting the storage unit 150 is implemented using a storage medium such as a memory (for example, a MicroSD (registered trademark) memory) of a flash memory type, a hard disk type, a multimedia card micro type, or a card type, a random access memory (RAM), or a read only memory (ROM).

The external input-output unit 160 is an interface with all external apparatuses connected to the smartphone 101 and is directly or indirectly connected to other external apparatuses by communication or the like (for example, universal serial bus (USB) or IEEE1394) or through a network (for example, the Internet, a wireless LAN, Bluetooth (registered trademark), radio frequency identification (RFID), infrared communication (Infrared Data Association (IrDA)) (registered trademark) Ultra Wideband (UWB) (registered trademark), or ZigBee (registered trademark)).

For example, the external apparatuses connected to the smartphone 101 include a wired/wireless headset, a wired/wireless external charger, a wired/wireless data port, a memory card or a subscriber identity module (SIM)/user identity module (UIM) card connected through a card socket, an external audio and video apparatus connected through an audio and video input/output (I/O) terminal, a wirelessly connected external audio and video apparatus, a smartphone connected in a wired/wireless manner, a personal computer connected in a wired/wireless manner, a PDA connected in a wired/wireless manner, and an earphone connected in a wired/wireless manner. The external input-output unit 160 may deliver data transmitted from the external apparatuses to each constituent inside the smartphone 101 or transmit data inside the smartphone 101 to the external apparatuses.

The GPS reception unit 170 receives GPS signals transmitted from GPS satellites ST1 to STn, executes a position measurement calculation process based on the plurality of received GPS signals, and detects a position including a latitude, a longitude, and an altitude of the smartphone 101 in accordance with an instruction from the main control unit 100. In a case where positional information can be acquired from the wireless communication unit 110 or the external input-output unit 160 (for example, wireless LAN), the GPS reception unit 170 can detect the position using the positional information.

For example, the motion sensor unit 180 comprises a three-axis acceleration sensor and detects a physical motion of the smartphone 101 in accordance with an instruction from the main control unit 100. By detecting the physical motion of the smartphone 101, a movement direction and an acceleration of the smartphone 101 are detected. A detection result is output to the main control unit 100.

The power supply unit 190 supplies power accumulated in a battery (not illustrated) to each unit of the smartphone 101 in accordance with an instruction from the main control unit 100.

The main control unit 100 comprises a microprocessor, operates in accordance with the control program and the control data stored in the storage unit 150, and controls each unit of the smartphone 101. In addition, the main control unit 100 has a mobile communication control function of controlling each unit of a communication system and an application processing function in order to perform voice communication and data communication through the wireless communication unit 110.

The application processing function is implemented by operating the main control unit 100 in accordance with the application software stored in the storage unit 150. For example, the application processing function is an infrared communication function of performing data communication with an opposing apparatus by controlling the external input-output unit 160, an electronic mail function of transmitting and receiving electronic mails, or a Web browsing function of browsing a Web page.

In addition, the main control unit 100 has an image processing function of, for example, displaying a video on the display and input unit 120 based on image data (data of a still image or a motion image) such as received data or downloaded streaming data. The image processing function is a function of decoding the image data, performing image processing on a decoding result, and displaying an image on the display and input unit 120 by the main control unit 100.

Furthermore, the main control unit 100 executes display control on the display panel 121 and operation detection control for detecting the user operation performed through the operation unit 140 and the operation panel 122.

By executing the display control, the main control unit 100 displays a software key such as an icon for starting the application software and a scroll bar, or displays a window for creating an electronic mail. The scroll bar is a software key for receiving an instruction to move a display part of the image for a large image or the like that does not fit in the display region of the display panel 121.

In addition, by executing the operation detection control, the main control unit 100 detects the user operation performed through the operation unit 140, receives an operation performed on the icon or an input of a text string in an input field of the window through the operation panel 122, or receives a scrolling request for a display image through the scroll bar.

Furthermore, by executing the operation detection control, the main control unit 100 has a touch panel control function of determining whether the operation position on the operation panel 122 is the superimposition part (display region) overlapping with the display panel 121 or the periphery part (non-display region) not overlapping with the display panel 121 and controlling the sensitive regions of the operation panel 122 and a display position of the software key.

In addition, the main control unit 100 may detect a gesture operation performed on the operation panel 122 and execute a preset function depending on the detected gesture operation. The gesture operation is not a simple touch operation in the related art and means an operation of drawing a trajectory by the finger or the like, designating a plurality of positions at the same time, or a combination thereof by drawing a trajectory from at least one of the plurality of positions.

The camera unit 141 is a digital camera that performs electronic imaging using an imaging element such as a CMOS. In addition, the camera unit 141 can convert image data obtained by imaging into compressed image data of JPEG or the like, store the image data in the storage unit 150, and output the image data through the external input-output unit 160 or the wireless communication unit 110 under control of the main control unit 100. As illustrated in FIG. 22, in the smartphone 101, the camera unit 141 is mounted on the same surface as the display and input unit 120. However, the mounting position of the camera unit 141 is not for limitation purposes. The camera unit 141 may be mounted on a rear surface of the display and input unit 120, or a plurality of camera units 141 may be mounted. In a case where the plurality of camera units 141 are mounted, imaging may be performed by a single camera unit 141 by switching the camera unit 141 to be used in the imaging, or imaging may be performed using the plurality of camera units 141 at the same time.

In addition, the camera unit 141 can be used in various functions of the smartphone 101. For example, the image acquired by the camera unit 141 can be displayed on the display panel 121, and the image of the camera unit 141 can be used as one of operation inputs of the operation panel 122. In addition, in a case where the GPS reception unit 170 detects the position, the position can be detected with reference to the image from the camera unit 141. Furthermore, with reference to the image from the camera unit 141, a determination of an optical axis direction of the camera unit 141 of the smartphone 101 and a determination of the current usage environment can be performed without using the three-axis acceleration sensor or along with the three-axis acceleration sensor. The image from the camera unit 141 can also be used in the application software.

Besides, the positional information acquired by the GPS reception unit 170, voice information (may be subjected to voice to text conversion and be obtained as text information by the main control unit or the like) acquired by the microphone 132, attitude information acquired by the motion sensor unit 180, and the like can be added to the image data of the still picture or the motion picture, and the image data can be stored in the storage unit 150 and be output through the external input-output unit 160 or the wireless communication unit 110.

For example, the image processing unit 31 and the system control unit 25 can be implemented by the main control unit 100.

An image processing apparatus that is one aspect of the present invention comprises an image acquisition unit that acquires a captured image in which a subject is imaged, a region division unit that divides the captured image into a plurality of regions based on brightness information of the captured image, a first white balance related information calculation unit that calculates first white balance related information for each of the plurality of regions divided by the region division unit, a second white balance related information acquisition unit that acquires second white balance related information set by a user for the captured image, and a priority region decision unit that decides a priority region which is decided based on the first white balance related information and the second white balance related information and for which a condition of a dynamic range expansion process to be performed on the captured image is set based on brightness of the priority region.

According to the present aspect, the first white balance related information calculation unit calculates the first white balance related information for each of the plurality of regions divided by the region division unit. The second white balance related information acquisition unit acquires the second white balance related information set by the user for the captured image. According to the present aspect, the priority region decision unit decides the priority region that is decided based on the first white balance related information and the second white balance related information and for which the condition of the dynamic range expansion process to be performed on the captured image is set based on the brightness of the priority region. Accordingly, in the present aspect, since the priority region of the dynamic range expansion process corresponding to a white balance actively set by the user is decided, the priority region that enables implementation of the dynamic range expansion process on which an imaging intention of the user is reflected can be decided.

It is preferable that the priority region decision unit decides the region in which a difference between the first white balance related information and the second white balance related information is small as the priority region.

According to the present aspect, the region in which the difference between the first white balance related information and the second white balance related information is small is decided as the priority region. Thus, the priority region that conforms with the imaging intention of the user is decided.

It is preferable that the region division unit divides the captured image into at least a highlight region and a shadow region, and the priority region decision unit decides the highlight region as the priority region in a case where a difference between the first white balance related information and the second white balance related information in the highlight region is smaller than the difference in the shadow region, and decides the shadow region as the priority region in a case where the difference in the shadow region is smaller than the difference in the highlight region.

According to the present aspect, the captured image is divided into at least the highlight region and the shadow region. The difference between the first white balance related information and the second white balance related information is calculated for the highlight region and the shadow region. The region in which the difference is small is decided as the priority region. Accordingly, in the present aspect, the priority region that conforms with the imaging intention of the user is decided.

It is preferable that the image processing apparatus further comprises a tone curve decision unit that decides a tone curve depending on the priority region.

According to the present aspect, the tone curve decision unit decides the tone curve depending on the priority region. Thus, the dynamic range expansion process can be executed based on the tone curve on which the imaging intention of the user is reflected.

It is preferable that the tone curve decision unit decides the tone curve that sets appropriate brightness of the priority region.

According to the present aspect, the tone curve decision unit decides the tone curve that sets appropriate brightness of the priority region. Thus, the dynamic range expansion process that can appropriately represent brightness of a region for which the user has a priority imaging intention can be performed.

It is preferable that the image processing apparatus further comprises a block division unit that divides the captured image into a plurality of blocks, in which the region division unit divides the captured image into the plurality of regions in units of blocks based on the brightness information of each of the plurality of blocks.

According to the present aspect, the block division unit divides the captured image into the plurality of blocks, and the region division unit divides the captured image into the plurality of regions in units of blocks based on the brightness information of each of the plurality of blocks. Accordingly, in the present aspect, the priority region configured with the blocks can be decided.

It is preferable that the first white balance related information calculation unit calculates the first white balance related information by decreasing a reference weight of the block positioned at each boundary between the plurality of regions below a reference weight of the block not positioned at each boundary.

According to the present aspect, the first white balance related information calculation unit calculates the first white balance related information by decreasing the reference weight of the block positioned at each boundary between the plurality of regions below the reference weight of the block not positioned at each boundary. Accordingly, in the present aspect, since the reference weight of the block of each region positioned at the boundary of the region in which a possibility of an appropriate value is low is decreased, the first white balance related information can be more appropriately calculated.

It is preferable that the image processing apparatus further comprises a white balance processing unit that performs a white balance correction process on the captured image.

According to the present aspect, the white balance processing unit performs the white balance correction process. Thus, the white balance correction process corresponding to the priority region on which the imaging intention of the user is reflected is executed.

It is preferable that the white balance processing unit performs the white balance correction process on the captured image based on the second white balance related information.

According to the present aspect, the white balance processing unit performs the white balance correction process on the captured image based on the second white balance related information. Thus, the white balance correction process corresponding to the imaging intention of the user is executed on the captured image.

It is preferable that the white balance processing unit performs the white balance correction process based on the second white balance related information in the priority region among the plurality of regions, and performs the white balance correction process based on the first white balance related information in a region other than the priority region among the plurality of regions.

According to the present aspect, the white balance processing unit performs the white balance correction process based on the second white balance related information in the priority region among the plurality of regions, and performs the white balance correction process based on the first white balance related information in the region other than the priority region among the plurality of regions. Accordingly, in the present aspect, the white balance correction process on which the imaging intention of the user is reflected is performed in the priority region, and the white balance correction process based on a pixel value is performed in the region other than the priority region. That is, in the present aspect, the white balance correction process set by the user is performed in the priority region, and the white balance correction process based on the pixel value of the region is performed in the region other than the priority region. Accordingly, for example, in the present aspect, even in a case where a different light source reaches each region, the white balance correction process is appropriately performed in each region.

It is preferable that the white balance processing unit performs the white balance correction process for each pixel constituting the captured image.

According to the present aspect, the white balance processing unit performs the white balance correction process for each pixel constituting the captured image. Thus, an appropriate white balance correction process is executed for each pixel.

It is preferable that the white balance processing unit performs the white balance correction process based on any one of the first white balance related information or the second white balance related information for each pixel constituting the captured image.

According to the present aspect, the white balance processing unit performs the white balance correction process based on any one of the first white balance related information or the second white balance related information for each pixel constituting the captured image. Thus, an appropriate white balance correction process is executed for each pixel.

It is preferable that the first white balance related information and the second white balance related information are information indicating a white balance correction amount, color temperature information, or a tint of a light source.

According to the present aspect, the first white balance related information and the second white balance related information are information indicating the white balance correction amount, the color temperature information, or the tint of the light source. Thus, the white balance correction process on which the imaging intention of the user is appropriately reflected can be performed.

An imaging apparatus that is another aspect of the present invention is an imaging apparatus in which the image processing apparatus is mounted, and comprises an exposure adjustment unit that adjusts exposure depending on the priority region.

According to the present aspect, the exposure adjustment unit adjusts the exposure depending on the priority region. Thus, exposure control on which the imaging intention of the user is reflected can be performed.

It is preferable that the exposure adjustment unit controls the exposure depending on a white void pixel of the captured image in a case where the priority region is on a highlight side more than a threshold value, and controls the exposure depending on a black solid pixel of the captured image in a case where the priority region is on a shadow side less than or equal to the threshold value.

According to the present aspect, the exposure adjustment unit controls the exposure depending on the white void pixel of the captured image in a case where the priority region is on the highlight side more than the threshold value, and controls the exposure depending on the black solid pixel of the captured image in a case where the priority region is on the shadow side less than or equal to the threshold value. Accordingly, in the present aspect, in a case where the imaging intention of the user is on the highlight side, and in a case where the imaging intention of the user is on the shadow side, the captured image is acquired by appropriately controlling the exposure.

An image processing method that is another aspect of the present invention comprises an image acquisition step of acquiring a captured image in which a subject is imaged, a region division step of dividing the captured image into a plurality of regions based on brightness information of the captured image, a first white balance related information calculation step of calculating first white balance related information for each of the plurality of regions divided in the region division step, a second white balance related information acquisition step of acquiring second white balance related information set by a user for the captured image, and a priority region decision step of deciding a priority region which is decided based on the first white balance related information and the second white balance related information and for which a condition of a dynamic range expansion process to be performed on the captured image is set based on brightness of the priority region.

An imaging method that is another aspect of the present invention comprises an image acquisition step of acquiring a captured image in which a subject is imaged, a region division step of dividing the captured image into a plurality of regions based on brightness information of the captured image, a first white balance related information calculation step of calculating first white balance related information for each of the plurality of regions divided in the region division step, a second white balance related information acquisition step of acquiring second white balance related information set by a user for the captured image, a priority region decision step of deciding a priority region which is decided based on the first white balance related information and the second white balance related information and for which a condition of a dynamic range expansion process to be performed on the captured image is set based on brightness of the priority region, and an exposure adjustment step of adjusting exposure depending on the priority region.

A program that is another aspect of the present invention causes a computer to execute an image processing method comprising an image acquisition step of acquiring a captured image in which a subject is imaged, a region division step of dividing the captured image into a plurality of regions based on brightness information of the captured image, a first white balance related information calculation step of calculating first white balance related information for each of the plurality of regions divided in the region division step, a second white balance related information acquisition step of acquiring second white balance related information set by a user for the captured image, and a priority region decision step of deciding a priority region which is decided based on the first white balance related information and the second white balance related information and for which a condition of a dynamic range expansion process to be performed on the captured image is set based on brightness of the priority region.

A program that is another aspect of the present invention causes a computer to execute an imaging method comprising an image acquisition step of acquiring a captured image in which a subject is imaged, a region division step of dividing the captured image into a plurality of regions based on brightness information of the captured image, a first white balance related information calculation step of calculating first white balance related information for each of the plurality of regions divided in the region division step, a second white balance related information acquisition step of acquiring second white balance related information set by a user for the captured image, a priority region decision step of deciding a priority region which is decided based on the first white balance related information and the second white balance related information and for which a condition of a dynamic range expansion process to be performed on the captured image is set based on brightness of the priority region, and an exposure adjustment step of adjusting exposure depending on the priority region.

An image processing apparatus disclosed in Appendix 1 below can be perceived from the above disclosure.

[Appendix 1]

An image processing apparatus comprising an image acquisition processor that acquires a captured image in which a subject is imaged, a region division processor that divides the captured image into a plurality of regions based on brightness information of the captured image, a first white balance related information calculation processor that calculates first white balance related information for each of the plurality of regions divided by the region division processor, a second white balance related information acquisition processor that acquires second white balance related information set by a user for the captured image, and a priority region decision processor that decides a priority region which is decided based on the first white balance related information and the second white balance related information and for which a condition of a dynamic range expansion process to be performed on the captured image is set based on brightness of the priority region.

While the examples of the present invention are described thus far, the present invention is not limited to the embodiments and can be subjected to various modifications without departing from the spirit of the present invention.

EXPLANATION OF REFERENCES

2: digital camera
3: camera main body
4: lens barrel
5: flash light emission unit
6: shutter button
7: power supply switch
8: display unit
9: operation unit
10: external memory
12: lens unit
20: mechanical shutter
21: imaging element
22: processing unit
23: AD conversion unit
24: main memory
25: system control unit
26: shutter drive unit
27: lens drive unit
28: power supply control unit
29: power supply
30: control memory
31: image processing unit
32: compression and decompression unit
33: storage control unit
35: display control unit
36: user interface
100: main control unit
101: smartphone
102: casing
110: wireless communication unit
120: display and input unit
121: display panel
122: operation panel
130: call unit
131: speaker
132: microphone
140: operation unit
141: camera unit
150: storage unit
151: internal storage unit
152: external storage unit
160: external input-output unit
170: GPS reception unit
180: motion sensor unit
190: power supply unit
301: image acquisition unit
303: block division unit
305: region division unit
307: first white balance related information calculation unit
309: second white balance related information acquisition unit
311: priority region decision unit
313: exposure adjustment unit
315: tone curve decision unit
317: white balance processing unit
401: captured image
402: person
403: highlight region
404: shadow region
step S101 to step S106: image processing step of first embodiment
step S201 to step S209: image processing step and imaging step of second embodiment
step S301 to step S309: image processing step and imaging step of third embodiment
step S401 to step S410: image processing step and imaging step of fourth embodiment

What is claimed is:

1. An image processing apparatus comprising:
a processor configured to
acquire a captured image in which a subject is imaged,
divide the captured image into a plurality of regions based on brightness information of the captured image,
calculate first white balance related information for each of the divided plurality of regions, acquire second white balance related infoimation set by a user for the captured image, and decide a priority region which is decided based on the first white balance related information and the second white balance related information and for which a condition of a dynamic range expansion process to be performed on the captured image is set based on brightness of the priority region.

2. The image processing apparatus according to claim 1, wherein the processor configured to decide the region in which a difference between the first white balance related information and the second white balance related information is small as the priority region.

3. The image processing apparatus according to claim 2, wherein the processor configured to divide the captured image into at least a highlight region and a shadow region, and decide the highlight region as the priority region in a case where a difference between the first white balance related information and the second white balance related information in the highlight region is smaller than the difference in the shadow region, and decide the shadow region as the priority region in a case where the difference in the shadow region is smaller than the difference in the highlight region.

4. The image processing apparatus according to claim 1, wherein the processor configured to divide the captured image into at least a highlight region and a shadow region, and decide the highlight region as the priority region in a case where a difference between the first white balance related infonnation and the second white balance related information in the highlight region is smaller than the difference in the shadow region, and decide the shadow region as the priority region in a case where the difference in the shadow region is smaller than the difference in the highlight region.

5. The image processing apparatus according to claim 1, wherein the processor configured to decide a tone curve depending on the priority region.

6. The image processing apparatus according to claim 5, wherein the processor configured to decide the tone curve that sets appropriate brightness of the priority region.

7. The image processing apparatus according to claim 1, wherein the processor configured to divide the captured image into a plurality of blocks, and divide the captured image into the plurality of regions in units of blocks based on brightness information of each of the plurality of blocks.

8. The image processing apparatus according to claim 7, wherein the processor configured to calculate the first white balance related information by decreasing a reference weight of the block positioned at each boundary between the plurality of regions below a reference weight of the block not positioned at each boundary.

9. The image processing apparatus according to claim 1, wherein the processor configured to perform a white balance correction process on the captured image.

10. The image processing apparatus according to claim 9, wherein the processor configured to perform the white balance correction process on the captured image based on the second white balance related information.

11. The image processing apparatus according to claim 9, wherein the processor configured to perform the white balance correction process based on the second white balance related information in the priority region among the plurality of regions, and performs the white balance correction process based on the first white balance related information in a region other than the priority region among the plurality of regions.

12. The image processing apparatus according to claim 9, wherein the processor configured to perfoini the white balance correction process for each pixel constituting the captured image.

13. The image processing apparatus according to claim 12, wherein the processor configured to perform the white balance correction process based on any one of the first white balance related information or the second white balance related information for each pixel constituting the captured image.

14. The image processing apparatus according to claim 1, wherein the first white balance related information and the second white balance related information are information indicating a white balance correction amount, color temperature information, or a tint of a light source.

15. An imaging apparatus in which the image processing apparatus according to claim 1 is mounted, wherein the processor configured to adjust exposure depending on the priority region.

16. The imaging apparatus according to claim 15, wherein the processor configured to control the exposure depending on a white void pixel of the captured image in a case where the priority region is on a highlight side more than a threshold value, and control the exposure depending on a black solid pixel of the captured image in a case where the priority region is on a shadow side less than or equal to the threshold value.

17. An imaging method using the imaging apparatus according to claim 15, the method comprising:

an image acquisition step of acquiring the captured image in which the subject is imaged;

a region division step of dividing the captured image into the plurality of regions based on brightness information of the captured image;

a first white balance related information calculation step of calculating the first white balance related information for each of the plurality of regions divided in the region division step;

a second white balance related information acquisition step of acquiring the second white balance related information set by the user for the captured image;

a priority region decision step of deciding the priority region which is decided based on the first white balance related information and the second white balance related information and for which the condition of the dynamic range expansion process to be performed on the captured image is set based on brightness of the priority region; and an exposure adjustment step of adjusting the exposure depending on the priority region.

18. A non-transitory computer readable recording medium storing a program causing a computer to execute an imaging method to function as the imaging apparatus according to claim 15, the method comprising:

an image acquisition step of acquiring the captured image in which the subject is imaged;

a region division step of dividing the captured image into the plurality of regions based on brightness information of the captured image;

a first white balance related information calculation step of calculating the first white balance related information for each of the plurality of regions divided in the region division step;

a second white balance related information acquisition step of acquiring the second white balance related information set by the user for the captured image;

a priority region decision step of deciding the priority region which is decided based on the first white balance related information and the second white balance related information and for which the condition of the dynamic range expansion process to be performed on the captured image is set based on brightness of the priority region; and an exposure adjustment step of adjusting the exposure depending on the priority region.

19. An image processing method using the image processing apparatus according to claim 1, the method comprising:

an image acquisition step of acquiring the captured image in which the subject is imaged;

a region division step of dividing the captured image into the plurality of regions based on the brightness information of the captured image;

a first white balance related information calculation step of calculating the first white balance related information for each of the plurality of regions divided in the region division step;

a second white balance related information acquisition step of acquiring the second white balance related information set by the user for the captured image; and a priority region decision step of deciding the priority region which is decided based on the first white balance related information and the second white balance related information and for which the condition of the dynamic range expansion process to be performed on the captured image is set based on the brightness of the priority region.

20. A non-transitory computer readable recording medium storing a program causing a computer to execute an image processing method to function as the image processing apparatus according to claim 1, the method comprising:

an image acquisition step of acquiring the captured image in which the subject is imaged;

a region division step of dividing the captured image into the plurality of regions based on brightness information of the captured image;

a first white balance related information calculation step of calculating the first white balance related information for each of the plurality of regions divided in the region division step;

a second white balance related information acquisition step of acquiring the second white balance related information set by the user for the captured image; and a priority region decision step of deciding the priority region which is decided based on the first white balance related information and the second white balance related information and for which the condition of the dynamic range expansion process to be performed on the captured image is set based on brightness of the priority region.

* * * * *